United States Patent
Fini et al.

(10) Patent No.: US 9,195,000 B2
(45) Date of Patent: Nov. 24, 2015

(54) TECHNIQUES FOR REDUCING CROSSTALK IN MULTICORE FIBERS

(75) Inventors: John M Fini, Metuchen, NJ (US); Thierry Franck Taunay, Bridgewater, NJ (US); Man F Yan, Berkeley Heights, NJ (US); Benyuan Zhu, Princeton, NJ (US)

(73) Assignee: OFS FITEL, LLC., Norcross, GA (US)

( * ) Notice: Subject to any disclaimer, the term of this patent is extended or adjusted under 35 U.S.C. 154(b) by 320 days.

(21) Appl. No.: 13/878,883

(22) PCT Filed: Oct. 12, 2011

(86) PCT No.: PCT/US2011/056046
§ 371 (c)(1),
(2), (4) Date: Apr. 11, 2013

(87) PCT Pub. No.: WO2012/051362
PCT Pub. Date: Apr. 19, 2012

(65) Prior Publication Data
US 2013/0188949 A1    Jul. 25, 2013

Related U.S. Application Data

(63) Continuation-in-part of application No. 12/959,184, filed on Dec. 2, 2010, now Pat. No. 8,923,678.

(60) Provisional application No. 61/265,997, filed on Dec. 2, 2009, provisional application No. 61/311,177, filed on Mar. 5, 2010, provisional application No. 61/314,165, filed on Mar. 16, 2010, provisional application No. 61/392,472, filed on Oct. 12, 2010.

(51) Int. Cl.
G02B 6/36        (2006.01)
G02B 6/02        (2006.01)

(52) U.S. Cl.
CPC ................................. G02B 6/02042 (2013.01)

(58) Field of Classification Search
None
See application file for complete search history.

(56) References Cited

U.S. PATENT DOCUMENTS 6,611,648 B2 *  8/2003  Kumar et al. .................. 385/126
2009/0263090 A1 * 10/2009  Dangui et al. ................ 385/126

* cited by examiner

Primary Examiner — Sung Pak
Assistant Examiner — Hoang Tran
(74) Attorney, Agent, or Firm — Jacobs & Kim LLP

(57) ABSTRACT

An optical fiber has two or more core regions disposed within a common cladding region. Each of the core regions is configured to guide a respective light transmission comprising at least one optical mode along the length of the fiber. The cores are arranged within the common cladding region according to a core configuration that substantially prevents crosstalk between modes of neighboring cores in the fiber, in a deployment of the fiber in which cross-coupling between neighboring cores is affected by perturbations arising in the deployed fiber.

11 Claims, 16 Drawing Sheets

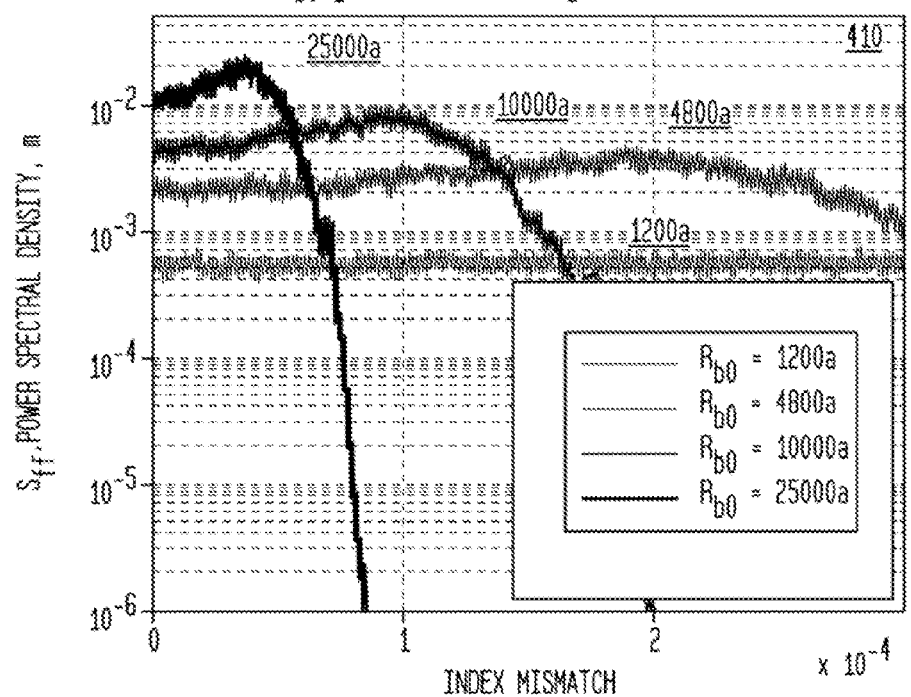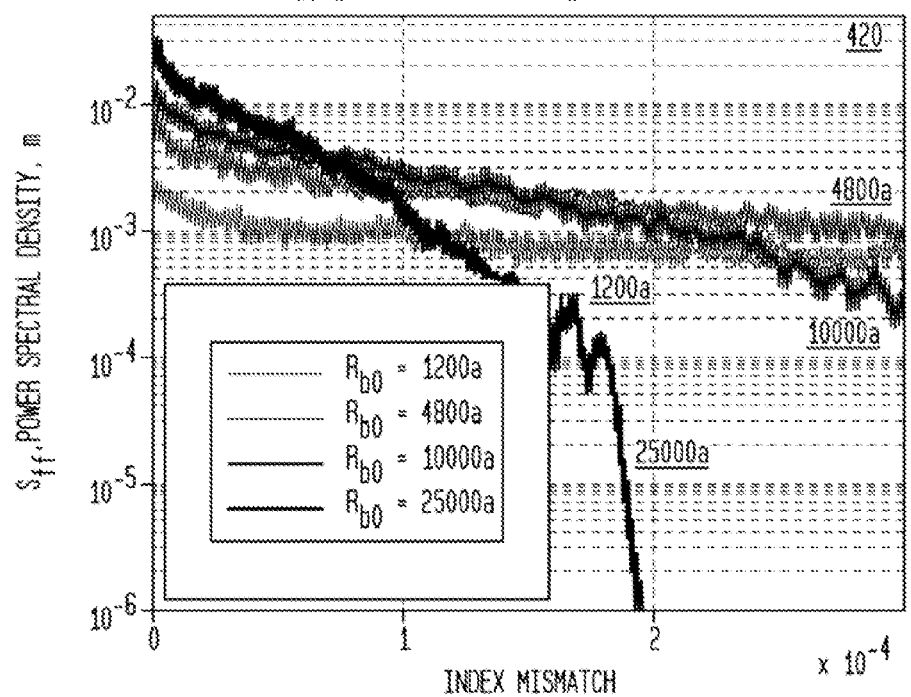

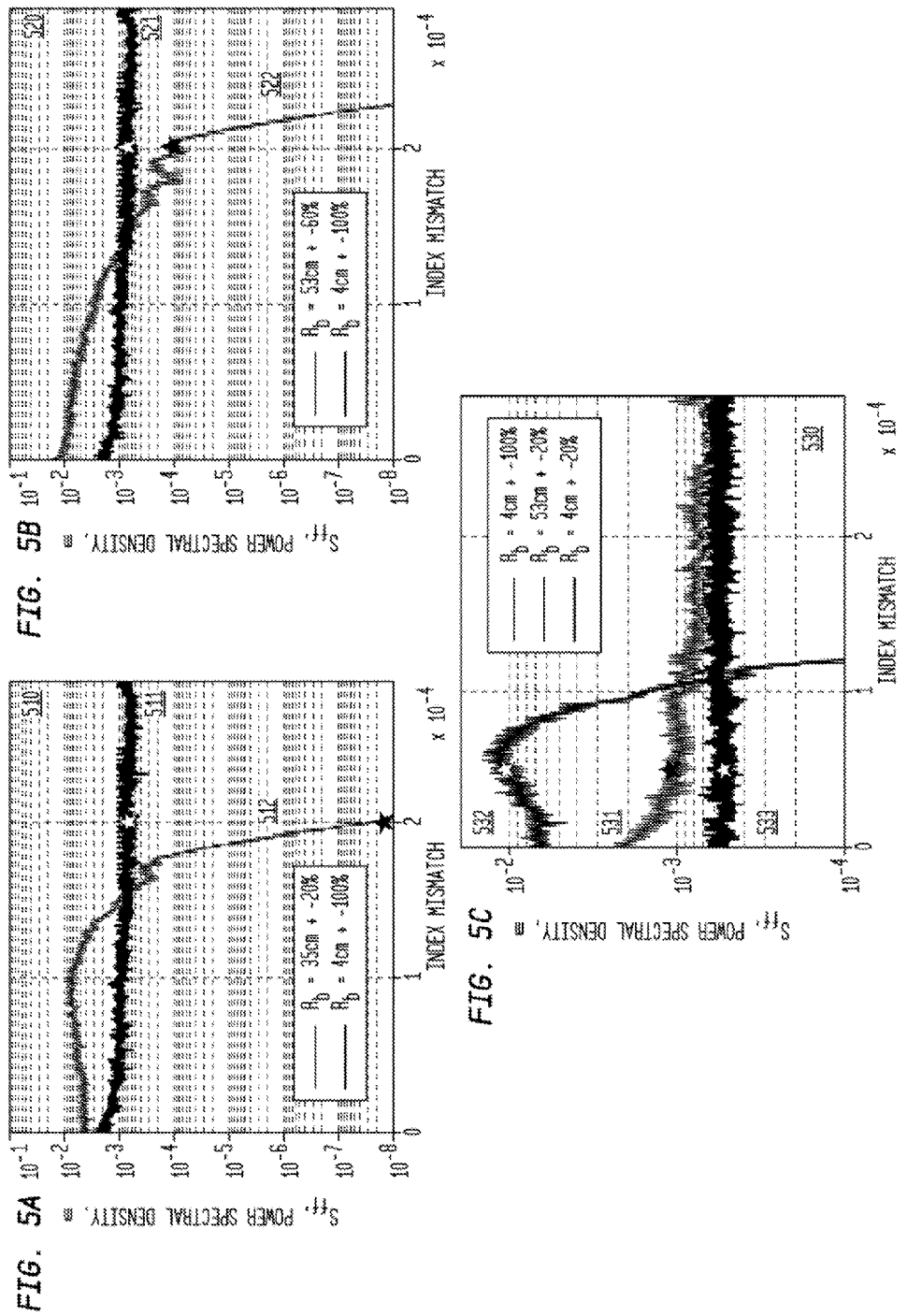

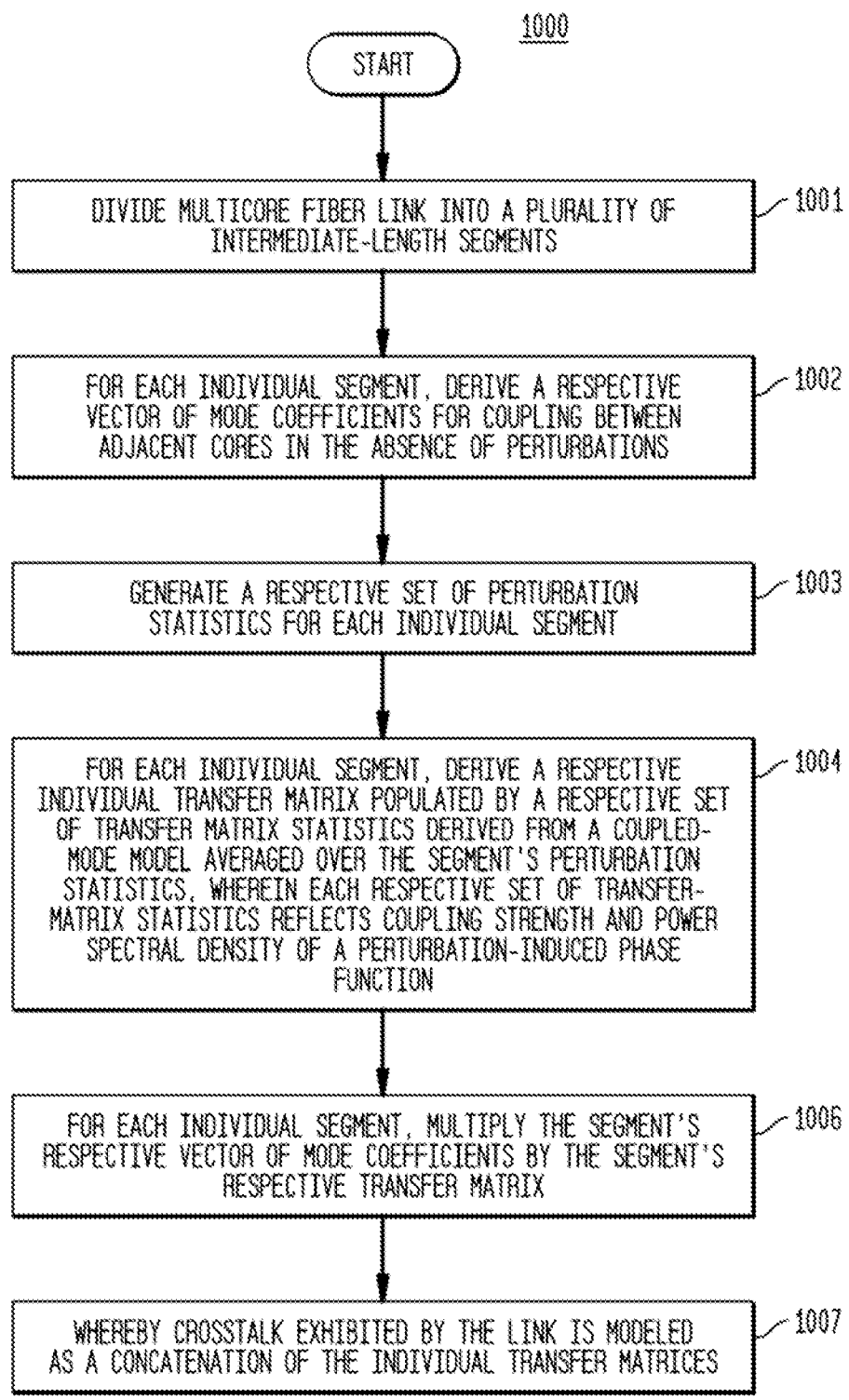

TECHNIQUES FOR REDUCING CROSSTALK IN MULTICORE FIBERS

CROSS REFERENCE TO RELATED APPLICATIONS

The present application claims the priority benefit of U.S. Provisional Patent Application Ser. No. 61/392,472, filed on Oct. 12, 2010, which is owned by the assignee of the present application, and which is incorporated herein by reference in its entirety.

The present application is a continuation-in-part of co-pending U.S. patent application Ser. No. 12/959,184, filed on Dec. 2, 2010, which is owned by the assignee of the present application, and which is incorporated herein by reference in its entirety.

U.S. patent application Ser. No. 12/949,184 claims the priority benefit of the following the priority benefit of the following United States provisional patent applications, which are all owned by the assignee of the present application, and which are all incorporated by reference herein in their entirety:

U.S. Provisional Patent Application Ser. No. 61/265,997, filed on Dec. 2, 2009;

U.S. Provisional Patent Application Ser. No. 61/311,177, filed on Mar. 5, 2010;

U.S. Provisional Patent Application Ser. No. 61/314,165, filed on Mar. 16, 2010; and U.S. Provisional Patent Application Ser. No. 61/392,472, filed on Oct. 12, 2010.

BACKGROUND OF THE INVENTION

1. Field of the Invention

The present invention relates generally to optical fiber devices and methods, and in particular to improved techniques for analyzing crosstalk in multicore fibers.

2. Background Art

Multicore fibers are becoming an increasingly important technology. Multicore fibers have been researched for many years, but are currently seeing a resurgence of interest as one of few remaining ways to significantly increase the capacity per fiber. In particular, multicore fibers potentially offer large improvements in cost and compactness for some systems, including some short-length interconnects where fiber congestion is a problem. At the same time, demand is quickly driving core telecommunications links towards fundamental limits of capacity per fiber, even assuming advanced modulation formats.

While it is clear that a multicore fiber can carry a lot of capacity, this technology will only be able to compete broadly with standard multiple fiber solutions if a number of technical hurdles are overcome. When comparing the cost and performance of a multicore to a multiple fiber solution, crosstalk is an obvious potential disadvantage of multicore. Crosstalk places significant constraints on the density of cores in a multicore fiber. Thus, maintaining low levels of crosstalk may be crucial to achieving high density.

Low-crosstalk multicore fiber designs are being actively researched. Multicore fibers can be engineered to have low crosstalk, but are typically subject to tradeoffs with other important parameters: effective area, density of cores, and cutoff. Nonlinearity and density of cores impose significant limits on the ultimate capacity scaling, and also determine the amount of signal processing, and thus electronic power consumption, that is necessary to recover transmitted information. Thus, strategies for achieving low crosstalk with low nonlinearity are thus of great interest.

An accurate crosstalk model is an important component in the development of a low-crosstalk multicore transmission link. Although models of crosstalk have been developed, these models have been proven to be unreliable. In particular, there have been large, qualitative disagreements between modeled crosstalk behavior and measurements taken from actual fibers.

Thus, there remains a need for improved multicore fiber designs that better address crosstalk between the cores as well as improved models and techniques for estimating crosstalk in such fibers.

SUMMARY OF THE INVENTION

An aspect of the invention is directed to an optical fiber, in which two or more core regions are disposed within a common cladding region. Each of the core regions is configured to guide a respective light transmission comprising at least one optical mode along the length of the fiber. The cores are arranged within the common cladding region according to a core configuration that substantially prevents crosstalk between modes of neighboring cores in the fiber, in a deployment of the fiber in which cross-coupling between neighboring cores is affected by perturbations, such as bends in the fiber, variations in fiber orientation, preform-derived variations, draw-induced variations, stress-induced variations, thermally-induced variations, chemically-induced variations, and radiation-induced variations arising in the deployed fiber. By preform-derived variations, we mean variations in the index profile which may include index variations, scaling variations, etc.

Another aspect of the invention provides a technique for estimating average crosstalk $\langle |dU|^2 \rangle$ between cores in a multicore fiber subject to perturbations. Accumulated crosstalk per unit length L is modeled as $$\langle |dU|^2 \rangle / L \approx \left| \frac{2\pi C}{\lambda} \right|^2 S_{ff}(\Delta\beta)$$

wherein $\lambda$ is the wavelength, C is the coupling coefficient, $\Delta\beta$ is the length-averaged mismatch between the propagation constants of the two modes, and $S_{ff}$ is the power spectral density of the phase mismatch induced by the length-varying part of perturbations.

A further aspect of the invention is directed to a multicore optical fiber having a spin or twist that that is configured to prevent crosstalk between modes of neighboring cores in the fiber, in a deployment of the fiber in which cross-coupling between neighboring cores is affected by random bend perturbations arising in the deployed fiber.

A further aspect of the invention is directed to a multicore optical fiber having a spin or twist or core design that that is configured to promote or optimize crosstalk between modes of neighboring cores in the fiber, in a deployment of the fiber in which cross-coupling between neighboring cores is affected by random bend perturbations arising in the deployed fiber.

BRIEF DESCRIPTION OF THE DRAWINGS

FIGS. 4A and 4B show a pair of graphs illustrating bend-dependence of crosstalk.

FIGS. 5A-5C are a series of graphs comparing the relative crosstalk accumulation of bend-challenged and bend-managed segments for three examples.

FIG. 10 is a flowchart of a general technique, according to various described aspects of the invention, for analyzing crosstalk in a multicore fiber link.

DETAILED DESCRIPTION

Figure 1:
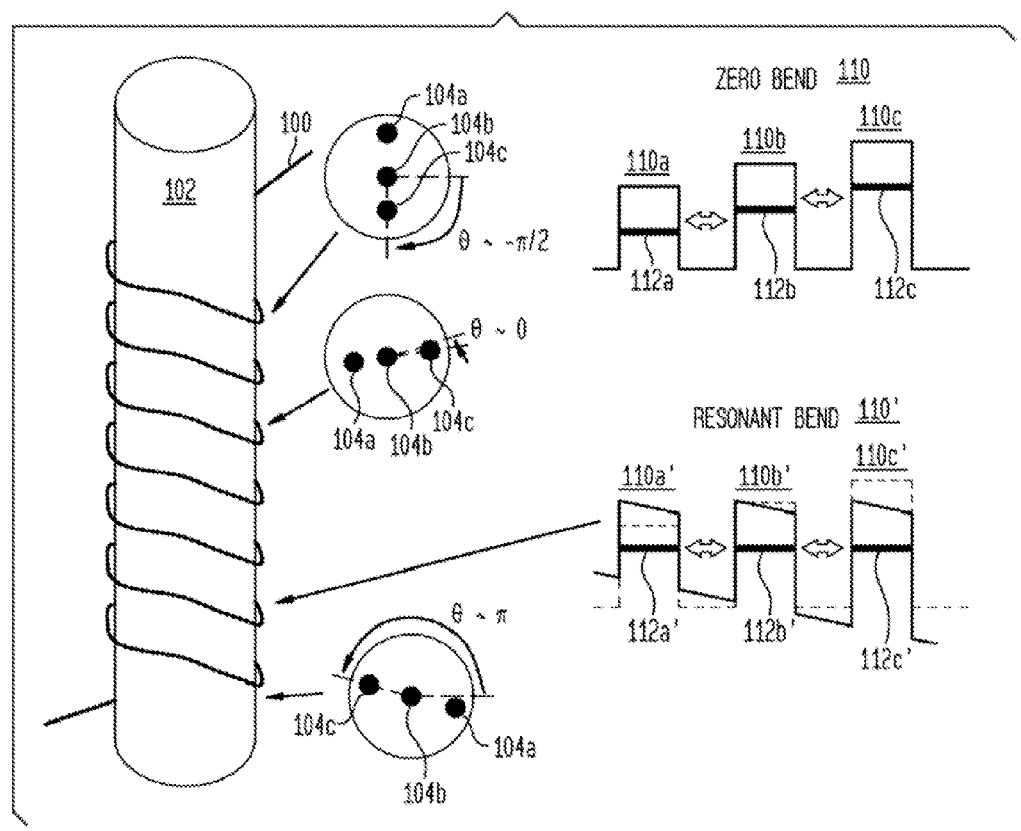
FIG. 1 is a diagram illustrating the intermittent phase matching that can occur between two or more cores of a multicore fiber as a result of bending.

Aspects of the invention are directed to techniques for analyzing and modeling crosstalk behavior in a multicore fiber transmission link.

As described below, it has been found that earlier crosstalk models failed to properly account for the effect of fiber bends and other perturbations. According to an aspect of the invention, a multicore link is divided into a series of individual segments. The accumulated crosstalk in each individual segment is modeled by averaging a coupling-mode equation over the segment's perturbation statistics. The total crosstalk for the link can then be calculated by concatenating the accumulated crosstalk of the individual segments.

According to a further aspect of the invention, individual segments and the accumulated crosstalk therein are categorized according to selected perturbation criteria. This categorization makes it possible to determine which perturbation, or perturbations, are dominant in the accumulation of crosstalk. For example, according to one practice of the invention, described below, individual segments of a multicore link are categorized as having "bend-managed" or "bend-challenged" deployments. Applying the described techniques, it is possible to determine which of these two types of segments is dominant in the accumulation of crosstalk, and to then make suitable modifications to the link in order to reduce crosstalk. Alternately, one could use the crosstalk information to make modifications to enhance or add crosstalk, depending on the desired fiber application.

According to aspects of the invention, discussed below, these and other techniques are used to provide a fiber having two or more cores disposed within a common cladding region, where each core is configured to guide a respective light transmission comprising at least one optical mode along the length of the fiber, and where the cores are arranged within the common cladding region according to a core configuration that substantially prevents crosstalk between modes of neighboring cores in the fiber, in a deployment of the fiber in which cross-coupling between neighboring cores is affected by perturbations arising in the deployed fiber.

According to a further aspect of the invention, the above fiber is implemented by using the following relationship to model the accumulation of $|dU|^2$ per unit length L:

$$\langle |dU|^2 \rangle / L \approx \left| \frac{2\pi C}{\lambda} \right|^2 S_{\!f\!f}(\Delta \beta)$$

wherein $\lambda$ is the wavelength, C is the coupling coefficient, $\Delta\beta$ is the length-averaged mismatch between the propagation constants of the modes of neighboring cores, and $S_{\!f\!f}$ is the power spectral density of the phase mismatch induced by the length-varying part of said perturbations.

The above aspect and practices of the invention, as well as others, are described in detail below and in the accompanying drawing figures. The present discussion is organized as follows:

Section 1

1.1 Bend-Induced Phase Matching
1.2 Analytical Approach
1.3 Results for Stationary Random Bend Processes Section 2

2.1 Introduction to Section 2
2.2 Coupling Models and Bend Statistics
2.3 Perturbations in the Coupled-Mode Model
2.4 Different Bending Regimes with No Other Perturbations
2.5 Accumulation in Bend-Challenged and Bend-Managed Segments
2.51 Example 1: 100 km Long-Haul Application
2.52 Example 2: 10 km PON Application
2.53 Example 3: Fiber with No Intentional Index Mismatch
2.6 Other Perturbations
2.7 Drift in the Scaling of the Entire Fiber Cross-Section During Draw
2.8 Bends Combined with Index-Profile Fluctuations
2.9 Section 2 General Techniques
2.10 Section 2 Conclusions Section 3

3.1 Gradual Variations
3.2 Gradual Variations: Numerical Examples
3.3 Variations That Are Not Gradual: Spin
3.4 Fast Spin and Crosstalk Reduction
3.5 General Techniques Section 1 is taken from U.S. patent application Ser. No. 12/959,184, of which the present application is a continuation-in-part, and describes techniques for using coupled-mode equations to provide a framework for analyzing and modeling the intermittent phase matching that can occur between two or more cores as a result of bending.

Bends are shown to play a crucial role in crosstalk, explaining large disagreement between experiments and previous calculations. The average crosstalk of a fiber segment is related to the statistics of the bend radius and orientation, including spinning along the fiber length.

In Section 2, an analytical framework is described taking into account both bend-induced perturbations and additional random perturbations. The described framework allows efficient and accurate estimates of crosstalk for realistic telecommunications links.

In Section 3, which supplements Sections 1 and 2, further aspects of the invention are discussed with respect to multicore fibers and techniques, wherein the perturbation $\delta\beta$ of the propagation constant (3 varies very gradually.

Section 1

1.1 Bend-Induced Phase Matching

There are now described techniques for using coupled-mode equations to provide a framework for analyzing and modeling the intermittent phase matching that can occur between two or more cores as a result of bending.

FIG. 1 is a diagram illustrating the intermittent phase matching that can occur between two or more cores as a result of bending. As the bend orientation wanders, bend perturbations change phase-matching. If the bend is tight enough, i.e., $$R_{bend} < a\gamma n_{core}/\Delta n_{skew},$$

then phase-matched coupling is achieved once or twice per twist period for each pair of neighboring cores.

In FIG. 1, a multicore fiber 100 is subjected to a constant-radius bend when wound around cylinder 102. Three core regions 104a, 104b, and 104c are depicted for fiber 100. For the purposes of illustration, it is assumed that fiber 100 includes a twisted region, in which outer cores 104a and 104c wind around center core 104b in a generally helical configuration, while substantially maintaining the distance therebetween.

The twist in multicore fiber 100 causes a periodic change in the bending orientation of cores 104a, 104b, and 104c. As shown in FIG. 1, as the twist angle of cores 104a, 104b, and 104c increases from $\theta \approx -\pi/2$ to $\theta \approx 0$, and then to $\theta \approx \pi$, there is a shift in the respective effective mode indices of the core regions. In particular, there is a shift between a zero bend profile 110 and a resonant bend profile 110', in which the respective indices 110a, 110b, and 110c for cores 104a, 104b, and 104c are shifted to new indices 110a', 110b', and 110c'. In the zero bend profile 110, phase mismatch is indicated by the non-alignment of effective mode index bars 112a, 112b, and 112c. In the resonant bend profile 110', the shifting of the index profiles has caused effective mode index bars 112a', 112b', and 112c' to move into alignment, indicating a phase matching resulting in crosstalk.

1.2 Analytical Approach

It is useful to think of the coupled-mode propagation as having three parts:

$$\frac{d}{dz}u = \frac{i2\pi}{\lambda}(A+B+C)u \quad (1.01)$$

Coupling is given by C, bend perturbations by B, and the unperturbed mode effective index, including manufacturing variation, etc., is given by A. These have very different properties generally:

A is diagonal, slowly varying (>~100 m), with index differences on the order of ~$10^{-5}$ to ~$10^{-4}$ in the case of unintentional variation, or up to ~$10^{-3}$ in the case of intentional skew.

B is diagonal, quickly varying, with index differences ~$\gamma n_{core} a/R_{bend}$, and can range from ~$10^{-6}$ to ~$10^{-3}$.

C is non-diagonal, slowly varying (>~100 m), with magnitude typically <<$10^{-6}$.

Further, while index differences in A may have some variation on shorter lengths, they will remain highly correlated for long lengths corresponding to splice intervals.

If it is possible to obtain analytical or statistical results for the transfer matrix $U(z_2,z_1)$ over short fiber segments, then a long-distance model can be expressed as a concatenation of these short-segment matrices:

$$U(L,0) = U(L,z_{N-1}) \ldots U(z_2,z_1)U(z_1,0) \quad (1.02)$$

Individual matrices $U(z_{p+1},z_p)$ can be approximately uncorrelated in the statistics of B, even though A has very long-range correlations. Thus in a concatenation model, individual matrices $U(z_{p+1},z_p)$ can represented by a statistical average over B, so that the concatenation is manageable.

Since C is small and A+B is diagonal, and thus integrable, a natural approach is $$\frac{d}{dz}P = \frac{i2\pi}{\lambda}(A+B)P \quad (1.03)$$

$$u = P\tilde{u} \quad (1.04)$$

$$\frac{d}{dz}\tilde{u} = \frac{i2\pi}{\lambda}P^{-1}CP\tilde{u} \quad (1.05)$$

If A is approximately constant over the interval z in $[z_1,z_2]$, $$P(z) = \exp\left(\frac{i2\pi}{\lambda}A(z-z_1)\right)\exp\left(\int_{z_1}^{z}\frac{i2\pi}{\lambda}B\right)P(z_1) \quad (1.06)$$

If the interval is small enough to neglect higher-order terms, the transfer matrix $U(z_2,z_1)$ is $$U(z_2,z_1) \approx 1 + \int_{z_1}^{z_2} dz \frac{i2\pi}{\lambda}P^{-1}CP \quad (1.07)$$

$$U_{n,m}(z_2,z_1) \approx \delta_{n,m} + \frac{i2\pi}{\lambda}C_{nm}\int_{z_1}^{z_2} dz P_{n,n}^{-1}P_{m,m} \quad (1.08)$$

The crosstalk induced over this interval is $|U_{nm}|^2$ for unequal n and m, $$|U_{n,m}|^2 \approx \left|\frac{2\pi C_{nm}}{\lambda}\right|^2 \int_{z_1}^{z_2} dz \int_{z_1}^{z_2} dz' (P_{n,n}^{-1}(z)P_{m,m}(z))^* P_{n,n}^{-1}(z')P_{m,m}(z'), \quad (1.09)$$

$$n \neq m$$

$$|U_{n,m}|^2 \approx \left|\frac{2\pi C_{nm}}{\lambda}\right|^2 \int_{z_1}^{z_2} dz \int_{z_1}^{z_2} dz' \cdot \quad (1.10)$$

$$\exp\left(\frac{i2\pi}{\lambda}(A_{m,m}-A_{n,n})(z'-z)\right)\exp\left(\int_{z}^{z'}\frac{i2\pi}{\lambda}(B_{m,m}-B_{n,n})\right), n \neq m \quad (1.11)$$

3. Results for Stationary Random Bend Processes

The unperturbed mismatch between cores can be written as $$\Delta n_{m,n}^{eff} = A_{m,m} - A_{n,n} \quad (1.12)$$

or as a propagation-constant mismatch, $$\Delta\beta_{m,n} = \frac{2\pi}{\lambda}(A_{m,m} - A_{n,n}). \quad (1.13)$$

Off-diagonal transfer matrix elements then start to resemble Fourier transforms:

$$U_{n,m}(z_2, z_1) \approx \frac{i2\pi}{\lambda} C_{nm} \quad (1.14)$$

$$\int_{z_1}^{z_2} dz \exp(i\Delta\beta_{m,n}(z-z_1)) \exp\left(\int_{z_1}^{z} \frac{i2\pi}{\lambda}(B_{m,m} - B_{n,n})\right), n \neq m$$

Now assume that $$f(z) \equiv \exp\left(\int_{z_1}^{z} \frac{i2\pi}{\lambda}(B_{m,m} - B_{n,n})\right) \quad (1.15)$$

is a stationary random process with correlation length smaller than $|z_2-z_1|$. Then, $$\langle |U_{n,m}|^2 \rangle \approx \quad (1.16)$$

$$\left|\frac{2\pi C_{nm}}{\lambda}\right|^2 \int_{z_1}^{z_2} dz \int_{z_1}^{z_2} dz' \exp(i\Delta\beta_{m,n}(z'-z))\langle f(z')f^*(z)\rangle, n \neq m$$

$$\langle |U_{n,m}|^2 \rangle \approx \left|\frac{2\pi C_{nm}}{\lambda}\right|^2 \int_{z_1}^{z_2} dz \int_{z_1}^{z_2} dz' \exp(i\Delta\beta_{m,n}(z'-z)) R_{ff}(z'-z) \quad (1.17)$$

$$\langle |U_{n,m}|^2 \rangle \approx \left|\frac{2\pi C_{nm}}{\lambda}\right|^2 (z_2-z_1) S_{ff}(\Delta\beta_{m,n}) \quad (1.18)$$

Here, $R_{ff}$ is the autocorrelation function of the random process f, and $S_{ff}$ is its power spectral density (PSD). This dictates a method for fabricating and deploying multicore fibers: select the fiber design, spin function, and bend statistics such that the above expression for the crosstalk in an interval $[z_1, z_2]$ is either small, if low crosstalk is desired, or large, if high crosstalk is desired. It can also be optimized so that the different elements corresponding to fiber pairs m,n are as close as possible, if this is desirable.

Considering designs for low crosstalk, for example, it is possible to assume that the preform design is already constrained (so that $C_{m,n}$ and $\Delta\beta_{m,n}$ are fixed) and that the bend profile $R_{bend}(z)$ statistics are determined by cabling and installation conditions. Thus, one approach to reduce or substantially eliminate crosstalk is to optimize the preform design such that the phase mismatching between cores is sufficiently large, and such that the crosstalk is sufficiently low. The spin profiles θ(z) can then be designed to minimize $S_{ff}(\Delta\beta_{m,n})$, as follows:

$$S_{ff}(\Delta\beta) \sim \int d\zeta \exp(i\Delta\beta\zeta)\langle f(z+\zeta)f^*(z)\rangle \quad (1.19)$$

These results also suggest methods of characterizing a fabricated fiber to determine its crosstalk characteristics: particular pairs of cores will tend to have higher crosstalk than others, across a range of deployment conditions, because these cores are closer to phase-matching. These cores can be identified at the time of fabrication, and cores can be selected for use based on their particular crosstalk. Eq. (9.7) can be used to design a test set of bend conditions that allow estimation of crosstalk in actual deployment conditions.

In the case of regular multicore fibers, nearest-neighbors all have the same spacing a, and so for nearest neighbor cores n,m with displacement angle $\theta_{m,n}$, $$f(z) \equiv \exp\left(\int_{z_1}^{z} \frac{i2\pi}{\lambda} \frac{\gamma n_{core}}{R_{bend}} a \cos(\theta - \theta_{m,n})\right) \quad (1.20)$$

Since we assumed f is stationary, its autocorrelation function and PSD are the same for all nearest-neighbor pairs in a regular multicore fiber.

This derivation relies on choosing the interval $\Delta z = Z_2 - z_1$ to satisfy three approximations:
1. $\Delta z \gg$ correlation length off,
2. $\Delta z$ is small enough that multiple coupling events can be neglected within the interval, and
3. $\Delta z \ll$ length scale of variation in A and C.

It is believed that the approximations will give useful trends even if not all three conditions can be met rigorously, for example, if multiple coupling events are not quite negligible within the correlation length off.

Section 2

2.1 Coupling Models and Bend Statistics

Section 2 describes an analytical framework that is generalized to include other types of random perturbations that are capable of causing intermittent coupling, thereby providing a more realistic model of crosstalk accumulation in typical settings in which multicore fibers are deployed. Power-coupling dynamics arise from the coupled-mode formulation, since randomness destroys phase coherence over long enough lengths. The total crosstalk is primarily determined by the largest perturbation.

The models described herein are useful in arriving at an understanding as to what degree of perturbation-management is necessary in a given link, and are generally useful in achieving practical, low-crosstalk links. Unlike previous approaches, the models described herein provide a framework for describing quantitatively how power coupling depends on fiber design, cabling, and other factors.

The described models and analytical techniques provide answers to fundamental questions of great practical importance. For example, the described models and techniques can be used to determine whether crosstalk will accumulate primarily in bend-challenged segments (as defined in section 2.2) of a transmission fiber, or in much longer straighter segments such as, for example, buried fiber segments. A further aspect of the invention is directed to a multicore optical fiber having a spin or twist or core design that that is configured to promote or optimize crosstalk between modes of neighboring cores in the fiber, in a deployment of the fiber in which cross-coupling between neighboring cores is affected by random bend perturbations arising in the deployed fiber.

In the following description, there is first presented a framework for analyzing and modeling the bend-induced perturbations in a multicore optical fiber link. This framework is then generalized to include other types of perturbations. In addition, there are presented a number of examples.

2.2 Coupling Models and Bend Statistics

A real-world optical fiber link typically comprises a plurality of segments having very different bend conditions. The majority of link segments, such as those comprising buried fibers, is quite long and can be laid out in a substantially straight configuration, with bends carefully managed. In the present description, these types of segments are referred to as "bend-managed." A bend-managed segment typically has a length significantly greater than 1 km, and further has "gentle" bends, i.e., bends having a radius significantly greater than 10 cm.

An optical fiber link typically also includes one or more link segments in which bends are not carefully managed. These segments, for example, include short segments at or near a transmitter or a receiver, where segments may have to be coiled tightly for compact storage of slack, may have to be bent around obstacles, may be kinked by poor handling, and the like. These bends are significant, because even relatively gentle bends qualitatively change crosstalk. In the present description, these types of segments are referred to as "bend-challenged." A bend-challenged segment typically has a length significantly less than 1 km, and further may have "tight" bends, i.e., bends having a radius significantly less than 10 cm.

Figure 2:
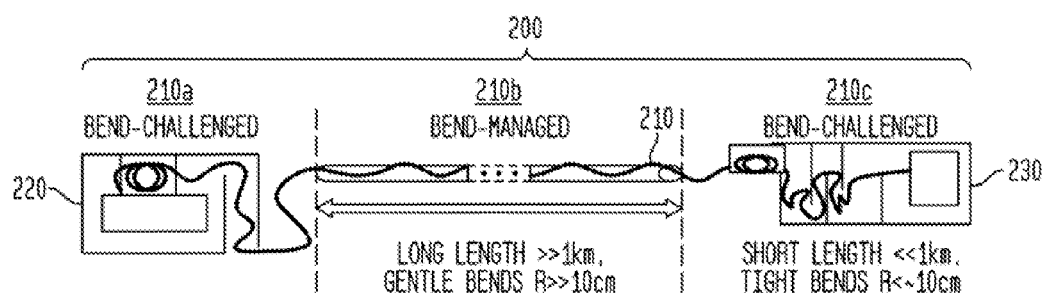
FIG. 2 shows a diagram of an exemplary transmission link, in which a multicore fiber is used to provide connectivity between a first terminal and a second terminal.

FIG. 2 shows a diagram of an exemplary transmission link 200, in which a multicore fiber 210 is used to provide connectivity between a first terminal 220 and a second terminal 230. Multicore fiber 210 comprises three segments: a short, bend-challenged segment 210a at the first terminal 220; a long, bend-managed segment 210b connecting the first terminal 220 and the second terminal 230; and a second short, bend-challenged segment 210c at the second terminal 230.

As used herein, the term "bend orientation" refers to the orientation of the fiber bends relative to the fiber cores. In a typical multicore fiber link, bend orientation is not fixed, but rather drifts randomly along the fiber length.

Figure 3:
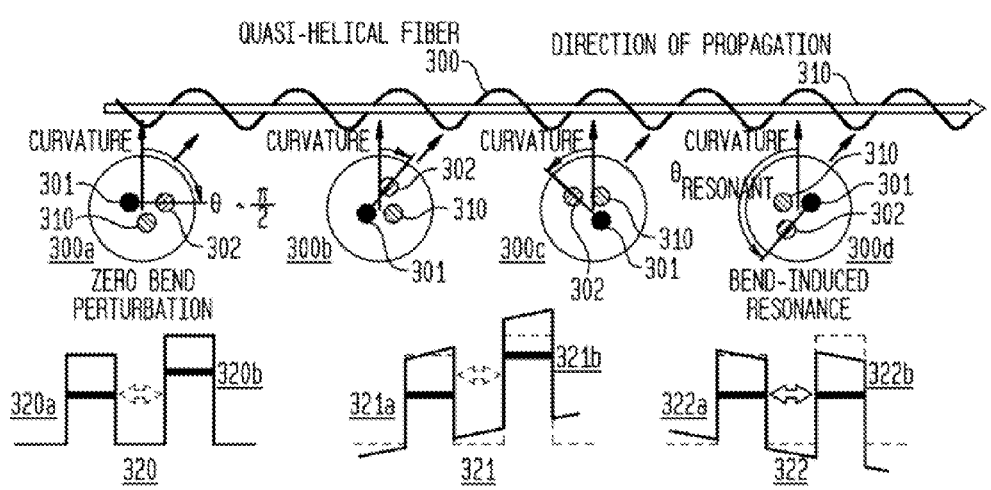
FIG. 3 shows a diagram illustrating the effect of a change in bend orientation on the relative index between pairs of neighboring cores, and how orientation drift leads to random intermittent resonant coupling.

FIG. 3 shows a diagram illustrating the effect of a change in bend orientation on the relative index between pairs of neighboring cores, and how orientation drift leads to random intermittent resonant coupling.

FIG. 3 shows a multicore fiber 300 that travels in a quasi-helical path around a given direction of propagation 310. As shown in fiber cross sections 300a-d, fiber 300 includes two cores 301 and 302. As further shown in cross sections 300a-d, as the fiber travels in its quasi-helical path around the direction of propagation 310, there is a change in the angular position of cores 301 and 302 relative to a hypothetical plane passing longitudinally through the center of the fiber.

At the bottom of FIG. 3 are shown three relative refractive index profiles 320, 321, and 322, illustrating the relative refractive indices of core 301 (bars 320a, 321a, 322a) and of core 302 (bars 320b, 321b, 322b) as fiber 300 travels along its quasi-helical path.

The unperturbed fiber (cross section 300a, refractive index profile 320) has an index mismatch between two cores that inhibits coupling. Each bend in the fiber causes a perturbation in the index profile, referred to herein as a bend-induced tilt or shift in the index profile. The amount of bend-induced tilt varies as a function of bend orientation.

As shown in cross sections 300b, 300c and refractive index profile 321, it is possible for a fiber bend to cause a shift in the index profile, which results in an increase in the index difference between neighboring cores, the crosstalk would be relatively reduced at those points However, as shown in cross section 300d and refractive index profile 322, it is possible for a fiber bend to cause a shift in the index profile that causes neighboring cores to be brought into index-matched alignment. Efficient, phase-matched coupling will occur at these index-matching points, the crosstalk would be relatively increased at those points.

As the bend orientation randomly drifts along the fiber length, the bend-induced shift in relative index between each pair of neighboring cores oscillates. In a link with random bend perturbations having bend-induced index profile shifts greater than the nominal index mismatch, the drift in orientation causes pairs of cores to be brought intermittently into alignment. Each pair of cores sees phase-matched resonant coupling twice for each full rotation (i.e., for each $2\pi$) of orientation drift. Thus, the barrier to coupling (i.e., the fabricated index mismatch) is overcome by sufficiently large random length-varying perturbations.

Changes in bend orientation are typically measured in centimeters. On the other hand, an optical link typically has a total length measured in kilometers. As described below, the details of bend perturbations on a centimeter scale have a significant impact on total crosstalk accumulated in an optical link.

However, the described bend-induced perturbations are random, and are not explicitly chosen or measured in a real system. Thus, according to an aspect of the invention, a link is modeled as a concatenation of intermediate-length segments (e.g., having an approximate length in the 10's of meters), in order to allow the details of the bends to be averaged away.

The concatenation of these segments is written as a transfer matrix multiplication:

$$v(L)=T(L,0)v(0)=T_N \ldots T_2 T_1 v(0) \quad (2.01)$$

In Equation 2.01, $v(0)$ is a vector of local mode coefficients at the start of a link; $v(L)$ is the vector of local mode coefficients over a length L of the link; $T(L,0)$ is the transfer matrix for the unsegmented link; and $T_1 \ldots T_N$ are a series of transfer matrices for the segmented link, wherein each transfer matrix corresponds to a respective segment.

According to an aspect of the invention, the individual transfer-matrix statistics are derived from coupled-mode equations averaged over bend statistics. There is now described an exemplary practice of the invention, illustrating how the calculation is performed. It will be appreciated that other techniques may also be used.

In the present example, the calculation is simplified by considering bends as a stationary random process within each segment, with a correlation length shorter than the length of the segment, i.e., less than $z_2 - z_1$, wherein z represents longitudinal distance along the length of the optical fiber link.

The basic power-coupling expression for crosstalk accumulated in a segment length $\Delta L$ (i.e., the power coupled from core m to core n over segment length $\Delta L$) from the statistics of the bend-induced phase $f$ is equal to, or substantially equal to, that length times the coupling strength times the power spectral density (PSD) of the bend induced phase function.

This relationship is set forth in Equation 2.02:

$$\langle |T_{n,m}(z_0 + \Delta L, z_0)|^2 \rangle \approx \Delta L \left| \frac{2\pi C_{nm}}{\lambda} \right|^2 S_{ff}(\Delta \beta_{m,n}) \quad (2.02)$$

Here, $\Delta \beta_{m,n} = (2\pi/\lambda)(A_{m,m} - A_{n,n})$ is the nominal index mismatch between cores. The power spectral density $S_{ff}(\Delta \beta_{m,n})$ correctly takes into account the statistics of the bend to determine, on average, what fraction of perturbations are large enough to cause intermittent resonant coupling.

In the simple case that all cores have the same spacing a, $$f(z) \equiv \exp\left(\int_{z_1}^{z} \frac{i2\pi}{\lambda} \frac{\gamma n_{core}}{(R_{bend}/a)} \cos(\theta - \theta_{m,n})\right). \quad (2.03)$$

where $f(z)$ is the Fourier transform of the accumulated bend phase, modeled as a stationary process with correlation length shorter than $z_2-z_1$.

Here, the power spectral density is $$S_f(\Delta\beta) = \int d\zeta \exp(i\Delta\beta\zeta) \langle f(z+\zeta)f^*(z)\rangle \quad (2.031)$$

The coupled-mode model gives rise to power-coupling dynamics: The crosstalk of the concatenation can be written in a general form, writing out the matrix multiplication as explicit sums over matrix elements:

$$\langle |T_{n,m}(L,0)|^2\rangle = \sum_{j_1\ldots j_{N-1},l_1\ldots l_{N-1}} \langle T^*_{1,j_1,m}T^*_{2,j_2,j_1}\ldots T^*_{N,n,j_{N-1}}T_{N,n,l_{N-1}}\ldots T_{2,l_2,l_1}T_{1,l_1,m}\rangle \quad (2.04)$$

The individual segments are uncorrelated. Thus, the bend statistics are independent. It should be noted, however, that random fiber variations may have longer correlation lengths:

$$\langle |T_{n,m}(L,0)|^2\rangle = \sum_{j_1\ldots j_{N-1},l_1\ldots l_{N-1}} \langle\langle T^*_{1,j_1,m}T_{1,l_1,m}\rangle \langle T^*_{2,j_2,j_1}T_{2,l_2,l_1}\rangle\ldots \langle T^*_{N,n,j_{N-1}}T_{N,n,l_{N-1}}\rangle\rangle \quad (2.05)$$

For segment lengths on the order of 10 meters, even a tiny variation in index is enough to destroy phase coherence. Thus; only power-coupling remains:

$$\langle T^*_{p,j_{p-1}}T_{p,l_p,l_{p-1}}\rangle = 0 \text{ if } j_p \neq l_p \text{ or } j_{p-1} \neq l_{p-1} \quad (2.06)$$

$$\langle |T_{n,m}(L,0)|^2\rangle = \sum_{l_1\ldots l_{N-1}} \langle\langle |T_{1,l_1,m}|^2\rangle\langle |T_{2,l_2,l_1}|^2\rangle\ldots\langle|T_{N,n,l_{N-1}}|^2\rangle\rangle \quad (2.07)$$

Thus, for links that are long enough, randomness destroys phase coherence. It follows that in links of sufficient length, the coherent transfer-matrix approach simplifies to power-coupling dynamics, which can be expressed as shown in Equation 2.08:

$$\langle |v(L)|^2\rangle = M_N\ldots M_2M_1\langle |v(0)|^2\rangle \quad (2.08)$$

In Equation 2.08, the elements $M_{p,m,n}$ of power-coupling matrices $M_1\ldots M_N$ incorporate the above-described coupled-mode model, including bends, as set forth in Equation (2.02), i.e.:

$$M_{p,m,n} = \langle |T_{p,m,n}|^2\rangle, \quad m\neq n \quad (2.09)$$

2.4 Perturbations in the Coupled-Mode Model

Crosstalk in multicore fibers is analogous to polarization in birefringent fibers or microbending. Coupling perturbations arise in the context of a coupled-mode model, but ultimately the analysis results in power-coupling with coefficients determined by the statistics of the perturbations. The coupled-mode equation used herein is $$\frac{d}{dz}v = \frac{i2\pi}{\lambda}(A+B+C)v, \quad (2.10a)$$

where $v$ is a vector of local mode coefficients and C is the (non-diagonal) matrix of coupling coefficients between cores. The diagonal matrix of relative effective index terms (i.e., the effective index of modes local to individual cores) is divided into two diagonal matrices A and B. Matrix A is populated by perturbation components that vary with length. Matrix B is populated by perturbation components having respective relative effective indices that are length-invariant, and which can therefore be modeled as stationary random processes.

Similarly, $$\frac{d}{dz}T = \frac{i2\pi}{\lambda}(A+B+C)T \quad (2.10b)$$

where T is the above-described transfer matrix.

It has been demonstrated by the inventors herein that random length-varying bend perturbations are very significant in a multicore fiber crosstalk model. Bend perturbations can easily dominate other terms in Equations (2.10a) and (2.10b), even for a large bend radii, e.g., on the order of approximately 1 meter.

While it is essential to include bend perturbations, since these can be quite large, various other perturbations may also be important. For example, it has been suggested that core-size fluctuations may be an important factor in crosstalk. The effective index of each core's local mode can be perturbed by stress, and temperature as well as length variations in the dopant profile and bends.

It will be seen that a perturbation common to all cores, such as uniaxial tension, will have no impact on crosstalk, to the first order. Thus, terms likely to yield the largest differential index between neighboring cores should be included in matrix B.

The calculation of crosstalk in a short segment can now be performed as follows. Using the approximation that A is approximately constant over the interval, and defining propagation-constant mismatch $\Delta\beta_{m,n}=(2\pi/\lambda)(A_{m,m}-A_{n,n})$, then $$T_{n,m}(z_{p+1},z_p) \approx \frac{i2\pi}{\lambda}C_{nm}\int_{z_p}^{z_{p+1}} dz\exp(i\Delta\beta_{m,n}(z-z_p))f_{n,m}(z), \quad (2.11)$$

and $$f_{n,m}(z) \equiv \exp\left(\int_{z_p}^{z} d\zeta\frac{i2\pi}{\lambda}(B_{m,m}(\zeta)-B_{n,n}(\zeta))\right) \quad (2.12)$$

for $n \neq m$.

If it can be assumed that $f$ is a stationary random process, then:

$$\langle |T_{n,m}|^2\rangle \approx \left|\frac{2\pi C_{n,m}}{\lambda}\right|^2 \int_{z_p}^{2z_{p+1}} dz \int_{z_p}^{z_{p+1}} dz'\exp(i\Delta\beta_{m,n}(z'-z))\langle f(z')f^*(z)\rangle, \quad (2.13)$$

and $$\langle |T_{n,m}|^2 \rangle \approx \left| \frac{2\pi C_{mn}}{\lambda} \right|^2 (z_{p+1} - z_p) S_{ff}(\Delta\beta_{m,n}) \quad (2.14)$$

Here $S_{ff}$ is the power spectral density, which is the Fourier Transform of the autocorrelation function, $$R_{ff}(\zeta) = \langle f(z+\zeta) f^*(z) \rangle \quad (2.15)$$

Eq. (2.14) now assumes that B may include other perturbations in addition to bends. From Eqs. (2.12) and (2.15) it is clear that, if B is a sum of statistically independent perturbations, $$B = B_1 + B_2 \quad (2.16)$$

then $R_{ff}$ is a product of the autocorrelations for each perturbation, $$R_{ff}(\zeta) = R_{f_1 f_1}(\zeta) R_{f_2 f_2}(\zeta). \quad (2.17)$$

The PSD of $f$ is then the convolution of the PSDs of the independent perturbations.

Of course, not all physically distinct perturbations are statistically uncorrelated. For example, bends may correlate with twist-induced strain, heating due to absorption in the coating, etc. Here, we will assume index-profile variations caused during fiber draw are independent of bend perturbations. This suggests that if enhanced cross-talk is desired, managing the bending characteristics is more effective than manipulating the core index mismatch.

2.5 Different Bending Regimes with No Other Perturbations

There is now considered the case in which a multicore optical fiber link is modeled as having a number of bend-challenged and bend-managed segments, but no other perturbations. As used herein, the term "bending regime" is used to generally refer to both bend-challenged and bend-managed segments.

Average crosstalk is a function of the effective index difference between the modes of neighboring cores, and of the statistics of the random bends. In this section, bends are the only perturbations included in B, with radius $R_b$ and orientation θ:

$$B_{m,m} = \frac{\gamma n_{core}}{R_b} (x_m \cos\theta + y_m \sin\theta). \quad (2.18)$$

To capture the quasi-helical shape of realistic fibers, curvature and bend orientation were generated according to the following Equations (2.19) and (2.20):

$$1/R_b = 1/R_{b0} + g_1(z) \quad (2.19)$$

$$d\theta/dz = K_0(z) + g_2(z) \quad (2.20)$$

where $g_1$ and $g_2$ are generated by filtering Gaussian white noise with a raised-cosine impulse response of length $L_1$ and $L_2$, respectively. Power spectral densities have been calculated for many different cases with varying size and correlation lengths of $g_1$ and $g_2$, and where $K_0$ included a constant spin, a sinusoidally varying spin rate, or zero nominal spin.

FIGS. 4A and 4B show a pair of graphs 410, 420 illustrating bend-dependence of crosstalk. In particular, FIGS. 4A and 4B show the relationship between the power spectral density Sff (y-axis) and index mismatch (x-axis) for two cases. In the plots shown in FIGS. 4A and 4B, the bend radius is given as a multiple of the core spacing a. Typically a~30-40 microns, and so the largest bend radii plotted are ~1 m.

FIG. 4A illustrates this relationship for a segment having a nearly constant radius of curvature, i.e., where the bend radius is relatively well-defined 2.0210=gRb. FIG. 4B illustrates this relationship for a segment having a more variable radius of curvature, i.e., where there are relatively large deviations in bend radius 0.1210=gRb.

It should be noted that fractional variations in bend radius could be very different depending on how the fiber is cabled. Thus, either end of the range illustrated in FIGS. 4A and 4B may be realistic. However, the impact on cost, compactness, etc. will need further study.

The important conclusion is that even for a perfectly uniform fiber, crosstalk accumulation will occur at very different rates in bend-challenged segments (FIG. 4A) and in bend-managed segments (FIG. 4B). The difference in rate can be an order of magnitude, or much more, depending on the typical index mismatch.

It has already been proposed that intentionally skewing the cores to give large index mismatch would reduce crosstalk. The results set forth herein allow the implementation of this strategy for realistic deployed fibers with bends, achieving orders of magnitude crosstalk reduction. It is also interesting to note that bend conditions can make an order of magnitude difference in crosstalk even for fibers with low index mismatch between neighboring cores, and that in this case tighter bends can give lower crosstalk.

2.5 Accumulation in Bend-Challenged and Bend-Managed Segments

Crosstalk accumulates much faster in bend-challenged segments, but these will typically make up a very small fraction of a communications link. The model we have presented above allows us to quantitatively address the question of whether crosstalk accumulates primarily in the bend-challenged portions of a link, or in the much longer bend-managed portions.

The following examples use a core spacing a=42 microns so that $R_{bend}$ can be quoted in meters. The PSD is a function of $R_{bend}$ only. The result is powerful in that it completely separates the bend impact and the index mismatch from the raw coupling coefficient.

FIGS. 5A-5C are a series of graphs comparing the relative crosstalk accumulation of bend-challenged and bend-managed segments for three examples.

2.51 Example 1

100 km Long-Haul Application

As a first example, corresponding to graph 510 shown in FIG. 5A, there is modeled a link having a total length 100 km. It is assumed that, of the 100 km, segments have a total length of 100 meters are bend-challenged, with a variable bend radius averaging approximately 4 cm, but that the layout of the remaining 99.9 km of buried fiber can be very well controlled (within +/−20%), with a nearly helical trajectory of bend radius 35 cm.

If non-identical cores are chosen so that every neighboring pair of cores has index mismatch $2 \times 10^{-4}$ or greater, FIG. 5A indicates that the bend-challenged rate of accumulation is ~47,000 times greater than the bend-managed segment. Since the bend-managed segment is only ~1000× longer than the bend-challenged segment, total accumulation should easily be dominated by the bend-challenged segments.

2.52 Example 2

10 km PON Application

In a second example, corresponding to graph 520 shown in FIG. 5B, there is modeled for purposes of comparison a PON with total length 10 km, but where the additional expense of providing very careful bend management has been avoided. It is assumed that the bend-challenged length is again 100 m with a variable bend radius of approximately 5 cm. The "bend-managed" portion has a nominal bend radius 53 cm, but with greater variation than the previous example: 6.0210=gRb.

If the index mismatch between neighboring cores is again $2 \times 10^{-4}$, FIG. 5B shows that the bend-challenged rate of accumulation less than 7 times greater than the bend-managed segment, but the length of the bend-managed segment is 100 times larger. Total accumulation should be dominated in this case by the bend-managed segment, despite the smaller ratio of lengths.

2.53 Example 3

Fiber with No Intentional Index Mismatch

In a final example, corresponding to graph 530 shown in FIG. 5C, there is considered a fiber with no intentional index mismatch between cores. Fabrication irregularity will lead to a distribution of index mismatches between neighboring cores, perhaps with a typical index mismatch of $\sim 0.5 \times 10^{-4}$.

FIG. 5C shows that if a well-defined 4 cm bend radius is intentionally introduced, crosstalk is much lower than for a relatively straight (radius ~1 m) fiber, and ~2× lower than bend-challenged portions of the fiber where the radius is more variable. For fiber fabricated with no skew, then, the "bend-managed" portion may consist of a fiber wound helically within the cable to provide a desirable radius of curvature.

Figure 6:
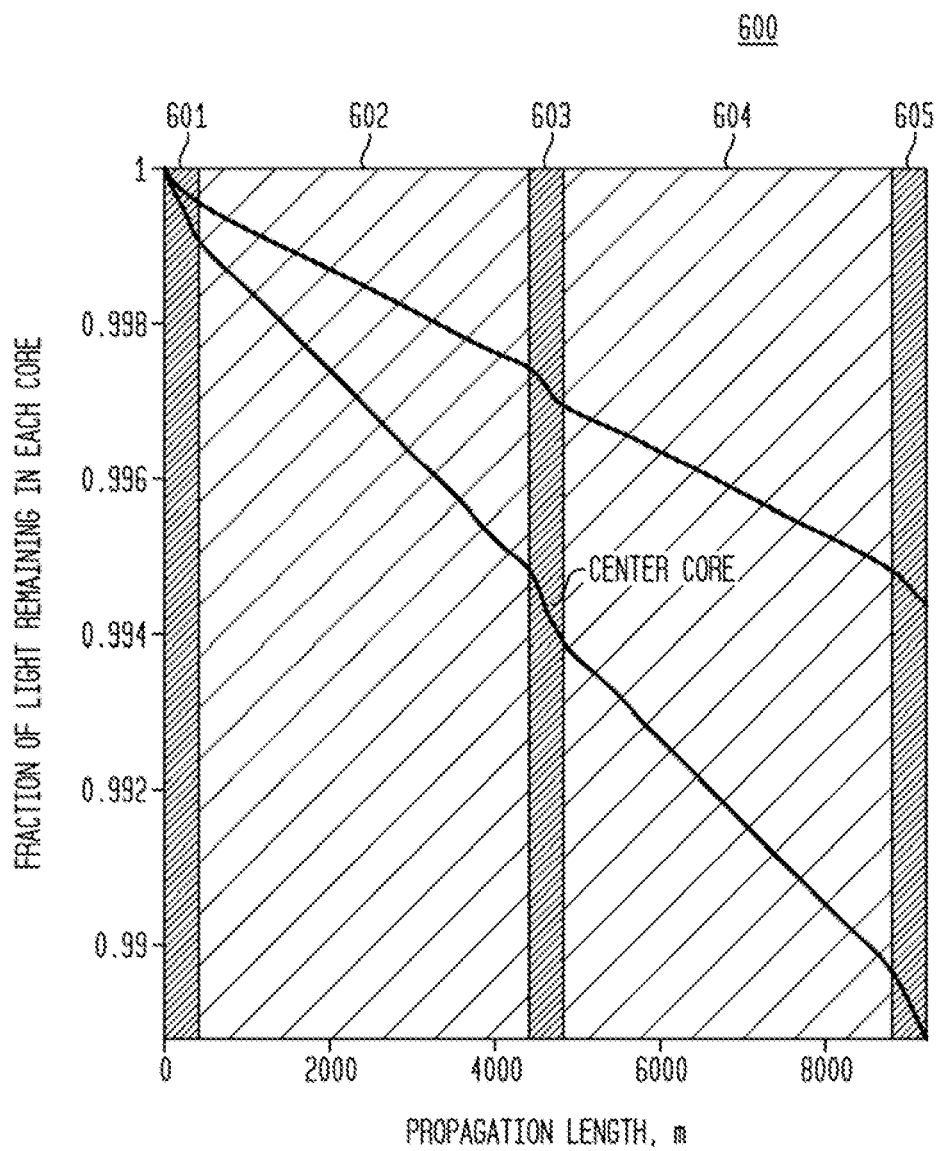
FIG. 6 shows a graph of an example of a simple power-coupling matrix calculation example, with three bend-challenged segments and two bend-managed segments.

FIG. 6 shows a graph 600 of an example of a simple power-coupling matrix calculation example, with three bend-challenged segments (bands 601, 603, and 605) and two bend-managed segments (bands 602 and 604).

In particular, the FIG. 6 example shows how power spectral density values, such as those shown in FIGS. 5A-5C, can be plugged into Eq. (2.08) to predict average crosstalk accumulation over long lengths. The diagonal elements of the power coupling matrix are plotted vs. length, assuming segments of length $\Delta L=40$ m, and coupling parameter $c_0=4.57 \times 10^{-9}$. The bend parameters follow Example 3 (FIG. 5C, graph 530), but there are three bend-challenged stretches of 400 m each (shaded pink), the remaining 8 km being bend-managed.

As expected, the rate of crosstalk accumulation is faster in the bend-challenged sections, but total crosstalk is dominated by the longer lengths of bend-managed fiber. For simplicity, all neighboring pairs were given the "typical" index mismatch here; more generally, in this formulation, effective index deviations for each core can be generated, along with arbitrary length variation of the statistical bend description along the length.

2.7 Other Perturbations

The formalism used to derive Eq. (2.02) applies equally well to random length-varying perturbations other than bends, as long as $f$ is a stationary random processes. We simply define the perturbation-induced phase function $f$ more generally in terms of the total length-varying B, not only the bend perturbation $$f_{n,m}(z) \equiv \exp\left(\int_0^z d\zeta \frac{i2\pi}{\lambda}(B_{m,m}(\zeta) - B_{n,n}(\zeta))\right).$$

This enters Eq. (2) using the standard PSD definition $$S_{ff}(\Delta\beta) = \int d\zeta \exp(i\Delta\beta\zeta) \langle f(z+\zeta) f^*(z) \rangle$$

There many known physical mechanisms for perturbing the index of a fiber mode, some of which have been mentioned above. These mechanisms include, for example, one or more of the following: bends in the fiber, variations in fiber orientation, preform-derived variations, draw-induced variations, stress-induced variations, thermally-induced variations, chemically-induced variations, and radiation-induced variations. For simplicity, we introduce bend radius $R_b$ and orientation $\theta$, and including all other perturbations into the term $\Delta n_{other}$ ($\gamma=1$ in the purely geometrical model, but can include stress corrections).

$$B_{m,m} = \frac{\gamma n_{core}}{R_b}(x_m \cos\theta + y_m \sin\theta) + \Delta n_m^{other}$$

Figure 7A:
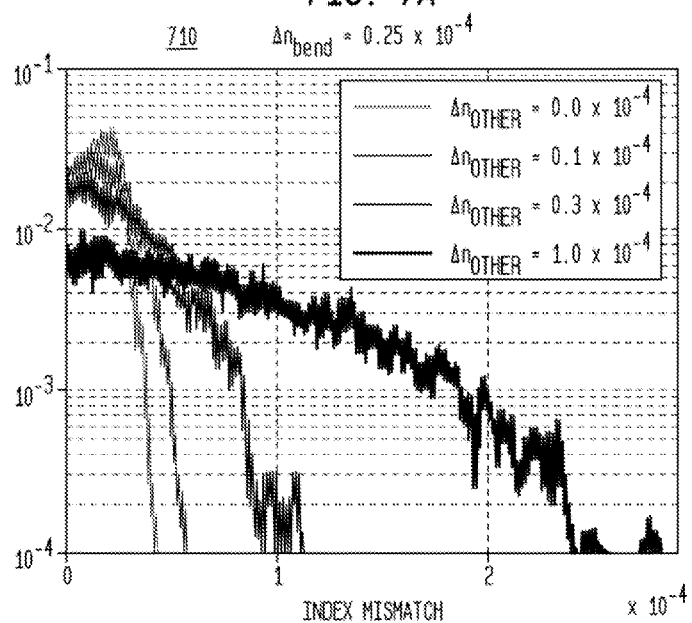
FIGS. 7A-7C show a series of graphs illustrating how crosstalk depends on the two independent perturbations, together with the index mismatch.
Figure 7B:
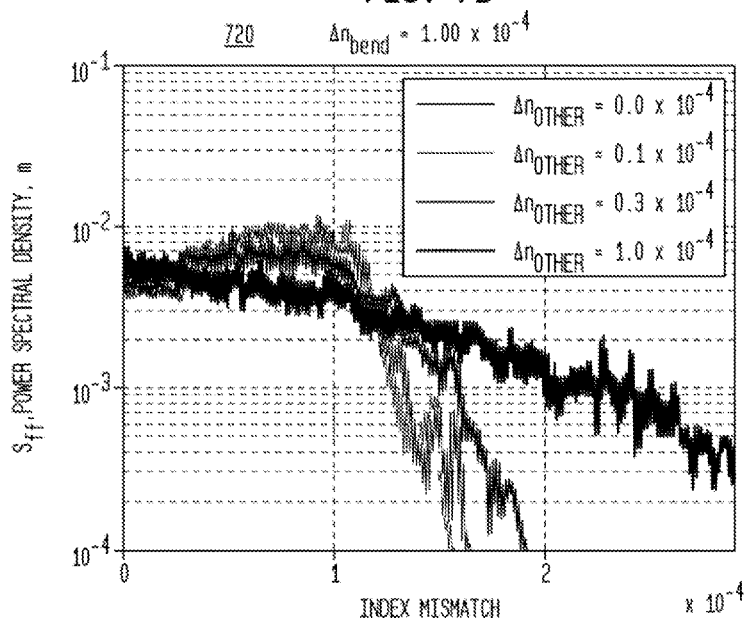
Figure 7C:
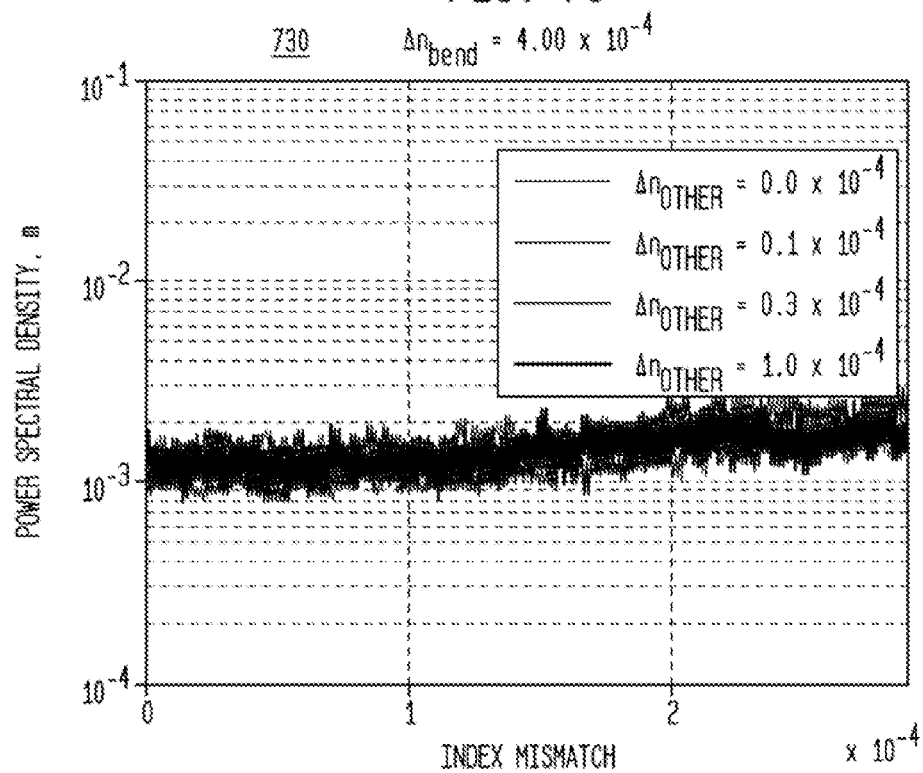

FIGS. 7A-7C are a series of graphs 710, 720, and 730 of simulations illustrating how crosstalk (proportional to the PSD) depends on the two independent perturbations, together with the index mismatch. The labels $\Delta n_{other}$ and $\Delta n_{bend}$ indicate the root-mean-square values. The simulation includes three filtered white noise sources—one added to the bend radius, one to the orientation twist rate, and the third being $\Delta n_{other}$.

As described schematically in FIG. 2, crosstalk becomes extremely small if the index mismatch is much larger than all perturbations, since intermittent resonant-coupling events become extremely rare. This is apparent in FIGS. 7A-7C: as perturbation magnitudes increase, the PSD broadens in proportional to $\Delta n_{other}$ and $\Delta n_{bend}$. Larger perturbations also lead to lower crosstalk for index mismatch=0 (since this represents perfectly resonant cores, index drift reduces phase matching). Intuitively, the PSD width is primarily determined by the larger of the perturbations: when $\Delta n_{bend}$ is large (right), there is essentially no impact of the other perturbations. This demonstrates that these perturbations are essentially equivalent in their ability to cancel the index mismatch and cause intermittent resonant coupling. Correlation lengths are considered on the order of order of 1 m for each random process used to generate the perturbations; detailed results were insensitive to correlation length in this regime.

2.7 Drift in the Scaling of the Entire Fiber Cross-Section During Draw

Figure 8A:
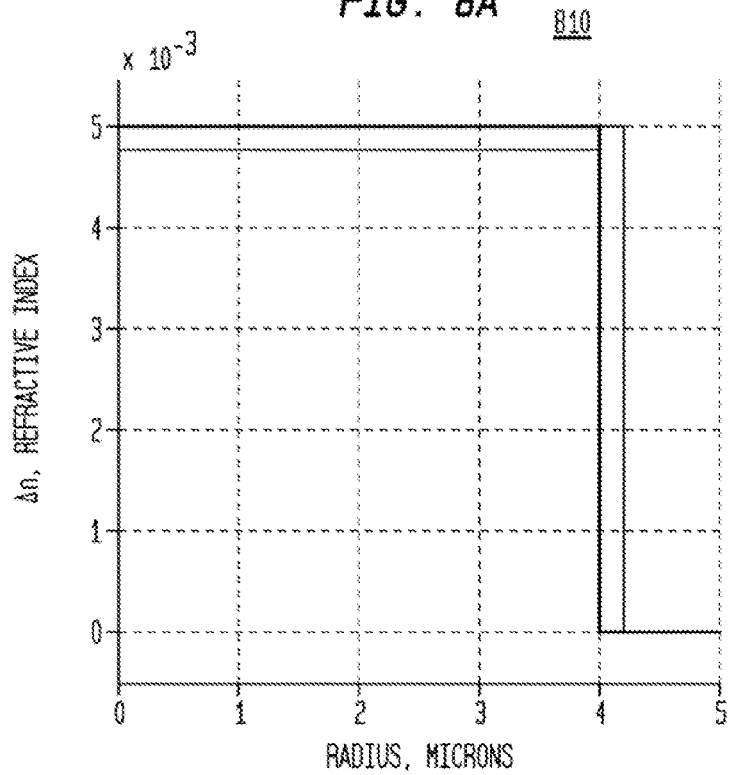
FIGS. 8A-8C show a series of graphs illustrating index vs. scaling factor for three nearly identical step-index fibers at 1550 nm.
Figure 8B:
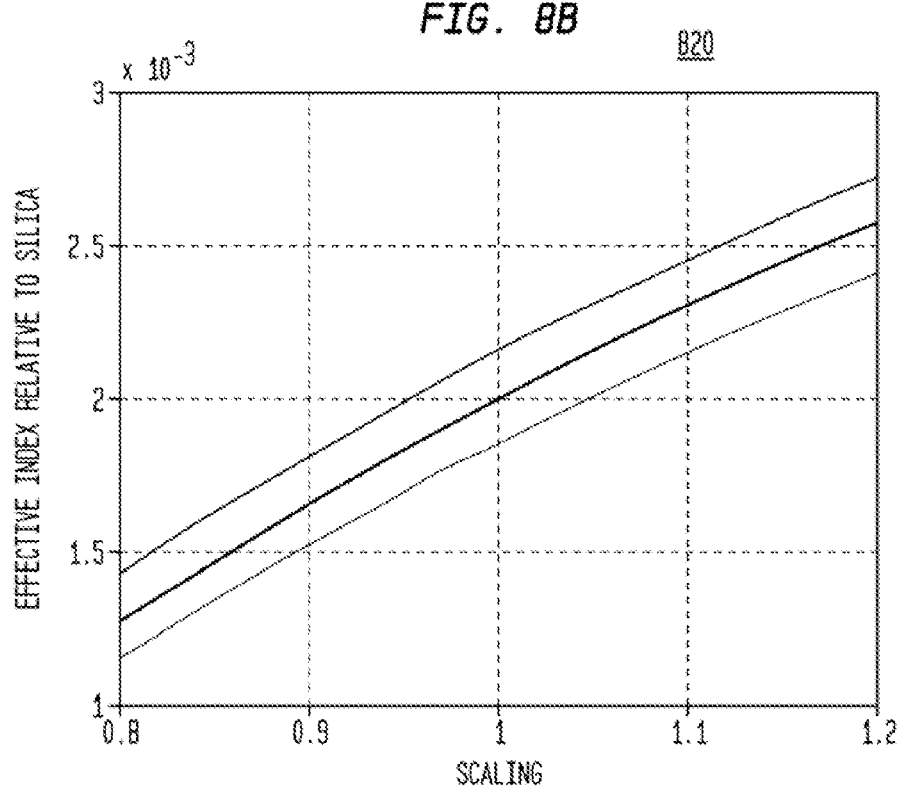
Figure 8C:
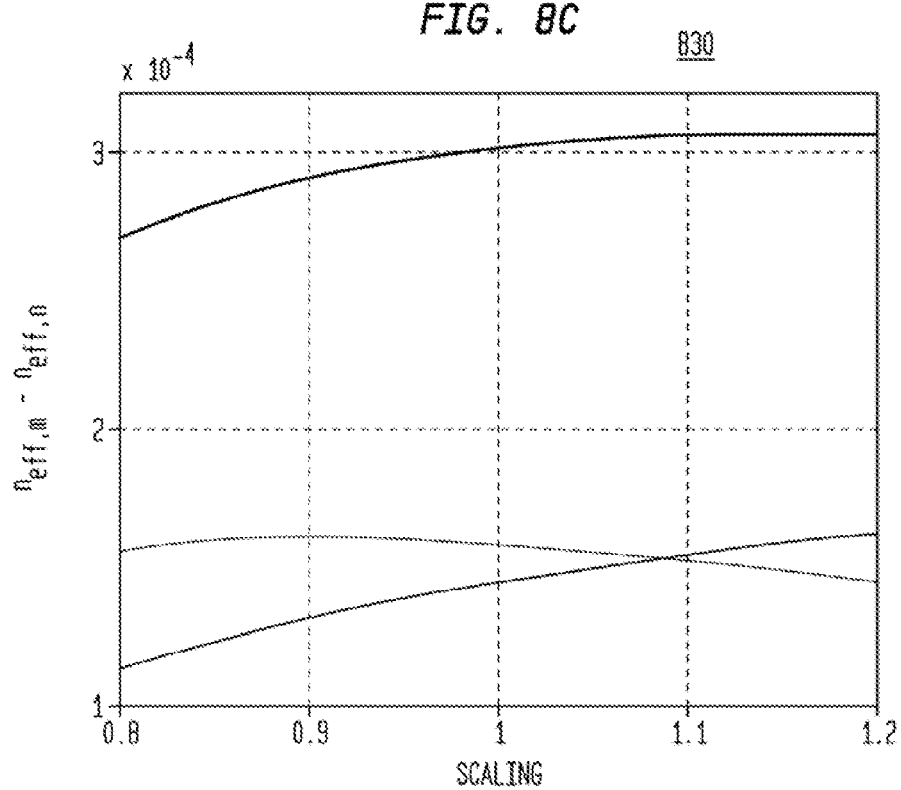

One perturbation to consider is drift in the scaling of the entire fiber cross-section during draw. Converting scaling fluctuations into index mismatch perturbations raises an important point: some perturbations primarily shift the effective index of all cores together, but only differential shift enters a crosstalk calculation. FIGS. 8A-8C are a series of graphs 810, 820, and 830 illustrating show index vs. scaling factor for three nearly identical step-index fibers at 1550 nm. The nominal effective index differences between cores are of order $10^{-4}$. The slopes with scaling are similar, so that even huge fluctuations in scaling factor (~20%) lead to small (<<$10^{-4}$) perturbations in effective index difference (Am,m–An,n). This suggests that scaling fluctuations common to all cores plays little role in crosstalk—especially since at least one much larger perturbation (bending) exists. This clarifies a recent result on core-size fluctuations: to have significant impact on crosstalk, these fluctuations would have to be significantly different for each core, not a common scaling of all cores.

2.8 Bends Combined with Index-Profile Fluctuations

In a further example, it is assumed that bend perturbations are combined with independent perturbations to the index profile, $\Delta n_{pert}$.

$$B_{m,m} = \Delta n_m^{pert} + \frac{\gamma n_{core}}{R_b}(x_m \cos\theta + y_m \sin\theta). \quad (2.21)$$

For simplicity, $\Delta n_{pert}$ is generated, like g1 and g2, by filtering Gaussian white noise through a raised-cosine FIR filter (the magnitude labeled in the figure is $$\Delta n_p = \langle n_{pert}|^2 \rangle^{1/2}).$$

Figure 9A:
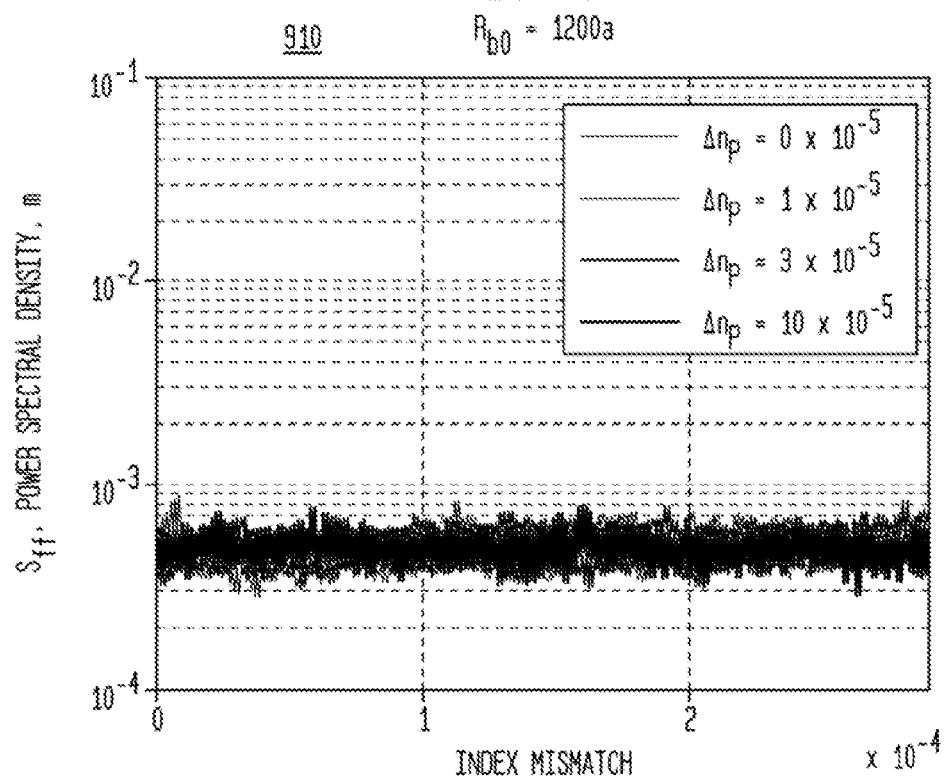
FIGS. 9A and 9B show a pair of graphs illustrating how bend perturbations and other independent perturbations combine to form the power spectral density.
Figure 9B:
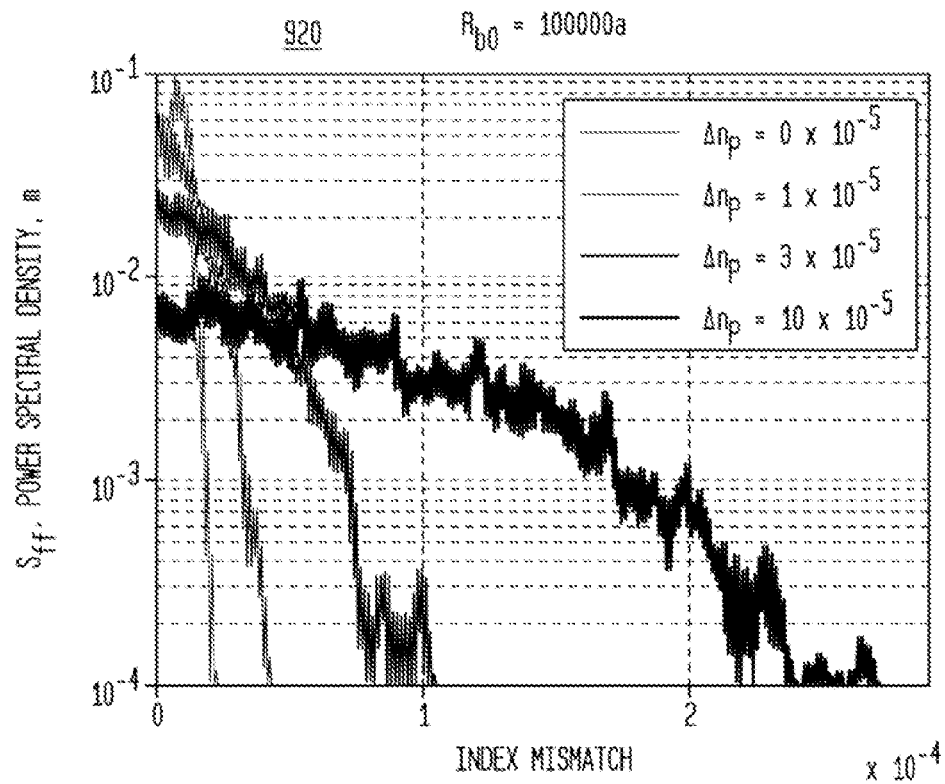

FIGS. 9A and 9B show graphs 910, 920 of results illustrating how bend perturbations and other independent perturbations combine to form the power spectral density. Each perturbation essentially broadens the index matching condition, as illustrated in FIG. 3. When one perturbation is much larger than the other, it determines the width of the power spectral density.

Index profile perturbations shift the relative effective index between cores in addition to the bend perturbations. These perturbations have little impact if the bend perturbations are large (FIG. 9A), but dominate the power spectral density if the bend perturbations are sufficiently small (FIG. 9B).

When the average bend radius is small (FIG. 9A), the bend perturbation is large, and small fabrication variations are essentially unimportant—the resonant-coupling condition has been sufficiently smeared that additional perturbations make little difference. On the other hand, if bends have been nearly eliminated (FIG. 9B), then naturally any other length-varying perturbations that shift the coupling resonance dominate the shape of the power-spectral density. This clearly suggests that index-mismatch strategies for low-crosstalk multicore fibers can succeed by some combination of reducing the dominant sources of length-varying perturbation (bends and otherwise) and by selecting index mismatch values large enough to resist the perturbations.

Naturally, the particular type of noise generated in this example influences the shape of the power spectral density. The curves in FIG. 9B take their shape from the arbitrary FIR filter choice used to generate $\Delta n_{pert}$. One important choice was to focus on the regime where both bends and other perturbations have many variations in a length ~10 m, and where there are no strong long-scale correlations in distance. The spectra are thus smooth, with no narrow features, and so convolution has a simple smoothing interpretation. Naturally, one can mathematically plug in a great variety of noise processes into the formalism, in some cases generating more structured PSDs. A more interesting possibility is to draw on recent high-resolution measurements of fiber variations to determine what variations are most relevant to real multicore fibers.

2.9 Section 2 General Techniques

FIG. 10 is a flowchart of a general technique 1000, according to various described aspects of the invention, for analyzing crosstalk in a multicore fiber link. Technique 1000 comprises the following:

Box 1001: Divide the multicore fiber link into a plurality of intermediate-length segments.

Box 1002: For each individual segment, derive a respective vector of mode coefficients for coupling between adjacent cores in the absence of perturbations.

Box 1003: Generate a respective set of perturbation statistics for each individual segment.

Box 1004: For each individual segment, derive a respective individual transfer matrix populated by a respective set of transfer matrix statistics derived from a coupled-mode model averaged over the segment's perturbation statistics, wherein each respective set of transfer-matrix statistics reflects coupling strength and power spectral density of a perturbation-induced phase function.

Box 1005: For each individual segment, multiply the segment's respective vector of mode coefficients by the segment's respective transfer matrix.

Box 1006: Whereby crosstalk exhibited by the link is modeled as a concatenation of the individual transfer matrices.

2.10 Section 2 Conclusions

Statistical approach allows us to calculate average crosstalk over many kilometers without losing track of the random centimeter-scale variations in bend radius, spin, fiber twist, etc.

This approach is applied to realistic heterogeneous spans, where the same fiber sees very different bends in different parts of the span. Crosstalk accumulation was studied as a function of the degree of bend management: one example showed that in low-crosstalk multicore fibers, crosstalk accumulation can be made very low in carefully bend-managed segments, held nearly straight, so that total crosstalk can be dominated by bend-challenged segments. In another example with less effective bend management, total crosstalk was dominated by the bend-managed segments. In a third example, we showed that cabling to intentionally produce a relatively tight and regular bend can reduce the crosstalk. Our understanding of bends has put us much closer to achieving low crosstalk in realistic links.

Generalizing our statistical model of crosstalk in a perturbed multicore fiber, we have investigated a combination of bends and other independent perturbations. Power spectral densities were simulated, and can be thought of intuitively as the fraction of the fiber where perturbations overcome the unperturbed index mismatch of the cores. When multiple perturbations exist together in this regime, the largest determines the impact on crosstalk. This has immediate relevance to low-crosstalk design: when designing a low-crosstalk fiber with intentionally skewed effective index in neighboring cores, the amount of skew should be enough to resist all combined perturbations to differential index. Bend management can help if it is a dominant perturbation, but other significant sources of perturbation might need to be managed as well.

The present invention relates to the general strategy of intentionally providing effective index differences between cores in a multicore fiber in order to reduce crosstalk. Calculations indicate that length-varying perturbations must be considered in order to achieve effective designs. Length-varying perturbations come from several physical mechanisms. Bend-induced index perturbations have been calculated, and are large enough to be important, but effective index perturbations can be induced by temperature, strain, twist, index profile fluctuations (including those induced during draw), etc.

Consideration of length-varying perturbations indicates that a revised strategy is needed to produce low-crosstalk fiber: one must provide an intentional index mismatch larger than the shifts in differential effective index caused by the perturbations. This condition has two main consequences:

1. The index difference should be substantially larger than one would conclude from an analysis with no perturbations.

2. Measures can be taken to reduce the length varying perturbations to relative effective index between neighboring cores. These measures may take many different forms corresponding to the different mechanisms. They involve methods known in the art, but used in the novel context of crosstalk in multicore fibers. In the example of bends, reducing the perturbations may take the form of avoiding tight bends during installation, cabling the fiber to avoid such bends, etc. In the case of thermal driven perturbations, the reduction may entail improving the heat-sinking through design of the cable or fiber coating, lowering the loss of the cores. In the case of draw-induced index-profile variations, the reduction may entail managing the relative viscosity of different regions of the fiber, changing the tension of the fiber during draw, etc. In the case of strain, the reduction may entail the geometric assembly of the multicore preform, material composition of the different preform components, design of the fiber coating and cable, draw conditions, etc.

Section 3

3.1 Gradual Variations

Further aspects of the invention are directed to multicore fibers and techniques, wherein the perturbation $\delta\beta$ of the propagation constant $\beta$ varies very gradually. In the case where the rate of variation is truly negligible, then it is possible to treat $\delta\beta$ as a constant in the integrals set forth and discussed below.

The statistical average can be calculated directly using the probability distribution $p_{\delta\beta}$:

$$\langle |dU_{m,n}|^2 \rangle \to L|\kappa_{m,n}|^2 \int_{-\infty}^{\infty} dz \int db\, p_{\delta\beta}(b) e^{ib(z-z')} \quad (3.01)$$

If this expression is evaluated naïvely, the integral in z gives $2\pi\delta(b)$, and thus $$\langle |dU_{m,n}|^2 \rangle \to 2\pi L |\kappa_{m,n}|^2 p_{\delta\beta}(0) \quad (3.02)$$

That is, in the quasi-static limit, crosstalk is proportional to the probability density measuring how often phase matching ($\delta\beta=0$) is achieved during the process of gradual intermittent phase matching. This reinforces the intuition of previous detailed calculations: if there is an intentional index mismatch between cores, the mismatch will suppress crosstalk only insofar as random perturbations cannot cancel the deterministic component. The probability density $p_{\delta\beta}(0)$ has units of $1/\delta\beta$. If there is no systematic index mismatch, $p_{\delta\beta}(b)$ will typically have a peak value at b=0 proportional to one over the spread $\Delta\beta$ in $\delta\beta$ (or the corresponding spread in random index perturbations $\Delta n_{\mathit{eff}}=\Delta\beta\lambda/2\pi$):

$$\langle |dU_{m,n}|^2 \rangle \sim 2\pi L|\kappa_{m,n}|^2/\Delta\beta \sim L|\kappa_{m,n}|^2 \lambda/\Delta n_{\mathit{eff}} \quad (3.03)$$

Of course, if the rate of variation is truly zero, it is not possible to assume ergodicity; i.e., the statistical average might differ significantly from the actual crosstalk, even over long lengths. Also, the correlation length would be much larger than L, contrary to the assumptions underlying these formulas. However, if $\delta\beta$ drifts at rate b', then:

$$\langle |dU_{m,n}|^2 \rangle \approx L|\kappa_{m,n}|^2 \int db\, p_{\delta\beta}(b) \int_{-\infty}^{\infty} dz\, e^{ib(z-z')} e^{ib'(z-z')/2} \quad (3.04)$$

$$\langle |dU_{m,n}|^2 \rangle \approx L|\kappa_{m,n}|^2 \int db\, p_{\delta\beta}(b) \sqrt{\frac{2\pi}{-ib'}}\, e^{-ib^2/(2b')} \quad (3.05)$$

$$\langle |dU_{m,n}|^2 \rangle \approx 2\pi L|\kappa_{m,n}|^2 \int db\, p_{\delta\beta}(b) \sqrt{\frac{i}{2b'\pi}}\, e^{-ib^2/(2b')} \quad (3.06)$$

If b' is small, the function sampling the probability distribution is delta-like. Thus, $$\sqrt{\frac{i}{2b'\pi}}\, e^{-ib^2/(2b')} \to \delta(b) \quad (3.07)$$

which again leads to:

$$\langle |dU_{m,n}|^2 \rangle \approx 2\pi L |\kappa_{m,n}|^2 p_{\delta\beta}(0) \quad (3.08)$$

It is noted that the actual value of b' falls out, as long as it is small enough so that the sampling function can resolve the probability distribution. In this model with constant b', L is chosen not much larger than the correlation length, and so a single segment will not be ergodic. However, a concatenation of many of these segments will sample many different values of b in proportion to $p_{\delta\beta}(b)$. In that case, the actual measured crosstalk may reasonably approximate the statistical average.

3.2 Gradual Variations

Numerical Examples

Many of the power-spectral density (PSD) calculations previously presented illustrate the regime of gradual variations just discussed.

Figure 11:
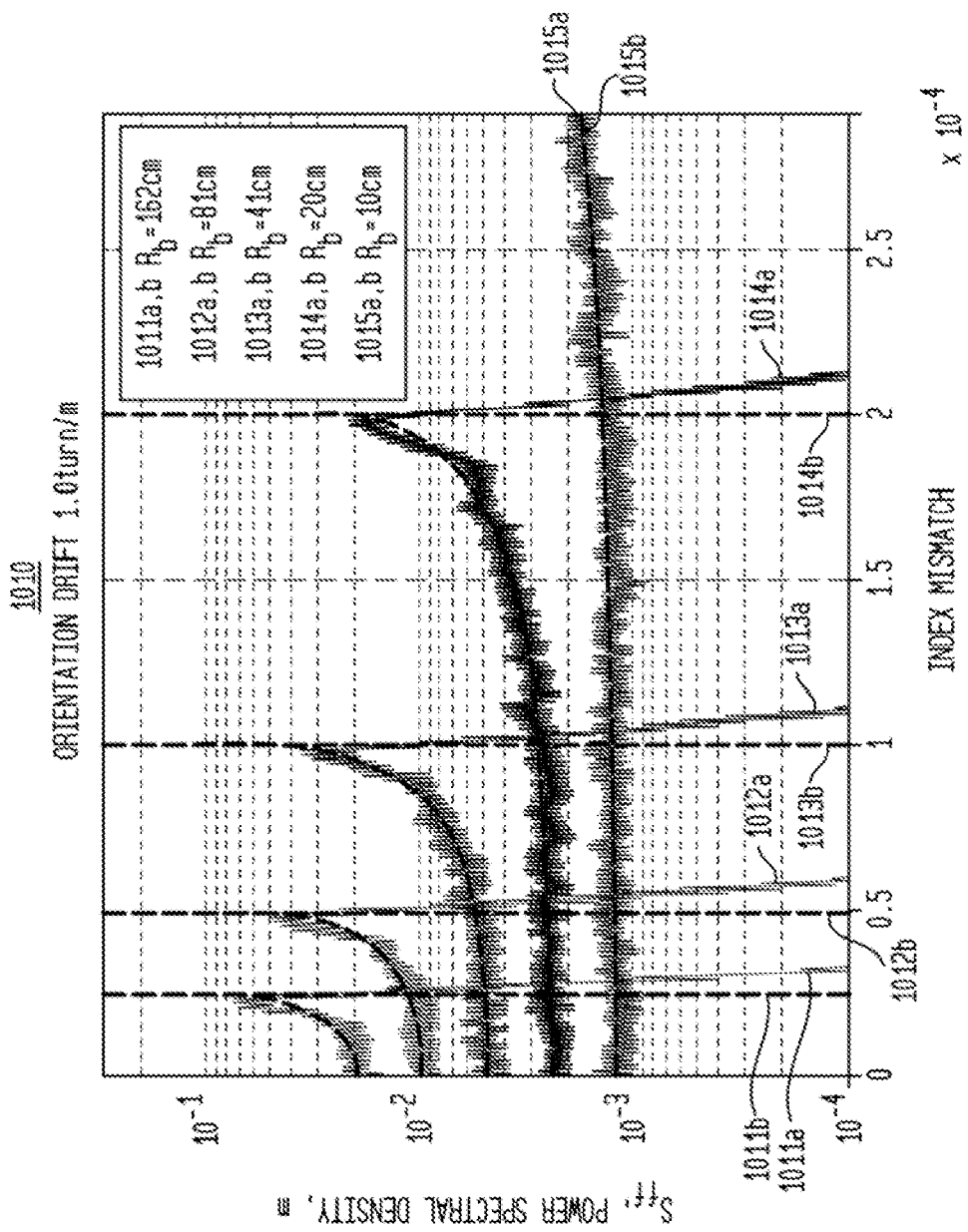
FIGS. 11-16 are a series of graphs comparing power spectral densities resulting from perturbations characterized by gradual drift and by short-length variations.

FIG. 11 shows a graph 1010 in which the phase-matching factor of crosstalk is calculated as a power spectral density (traces 1011a-1015a) and compared to the quasi-static approximation (trace 1011b-1015b) for the simple case where the index perturbation is due to constant bend radius and gradual orientation drift.

Graph 1010 provides a comparison of the PSD calculation and a quasi-static approximation for a bend perturbation with a slow orientation drift of 1.0 turn per meter. Several bend radii are shown, and the curvature in each case is assumed to be perfectly constant. For the PSD calculations, 40 m long randomly generated processes were used; 16 iterations were averaged to smooth out fluctuations. For the quasi-static formula, it was assumed that the bend orientation $\theta$ is uniformly distributed to derive the probability density function of $b \propto \cos(\theta)$:

$$p_{\delta\beta}(b) = \frac{1}{b_0 \pi \sqrt{1-(b/b_0)^2}} \quad (3.09)$$

$$b_0 = 2\pi\gamma n_{core} a / R_{bend} \qquad (3.10)$$

$$f(z) \approx \exp\left(\frac{i a \gamma n_{core} \Lambda_{spin}}{\lambda R_{bend}} \sin(2\pi z / \Lambda_{spin})\right) \qquad (3.11)$$

Here, a is the core spacing, and γ may include a stress correction to the purely geometrical (γ=1) bend perturbation model. It will be seen that the quasi-static expression (dashed traces 1011b-1015b) approximates the PSD calculations very well. The dashed distributions ~1/sin(θ) have peaks with infinite probability density followed by an abrupt drop to zero probability. These features are naturally smoothed by the PSD calculations, since the correlation length and the spectral estimation method have finite resolution. The shapes of the curves are characteristic of bend perturbations with well-defined radius. A more realistic link would include uncertainty in the bend radius and other sources of fiber variation, and may typically have a more bell-shaped curve.

3.3 Variations that are not Gradual

Spin

It is believed that gradual variations are likely to play an important role in crosstalk for realistic telecom fibers. It is further believed with a high degree of certainty that preform variations will manifest only on very long lengths of fiber. Changes in fiber curvature and random orientation drift (which modulates the bend perturbation) likely occur on the order of a 1 m scale, which is slow compared to $1/\Delta\beta$. However, it is not difficult to construct examples of perturbations with variations on a much shorter length scale. The PSD formulation described herein covers both cases.

For the purposes of the present discussion, the term "spun fiber" refers to an optical fiber that is fabricated using a process in which the fiber is rotated around its longitudinal axis as the fiber is drawn. (It would also be possible to fabricate a spun fiber by rotating the drawn fiber relative to the preform, rotating the preform during draw, or rotating both the drawn fiber and the preform. The term "twisted fiber" refers generically to a fiber subject to rotational perturbations, bending, spins, and the like. Rotation imposed during draw (spin) and after draw (twist) can different significantly due to stresses, but tend to have a similar description in terms of the orientation of the bend. The following examples focus on spun fibers. It will be appreciated that some or all of the present discussion also applies to other types of twisted fibers, but with additional stress perturbations.

Figure 12:
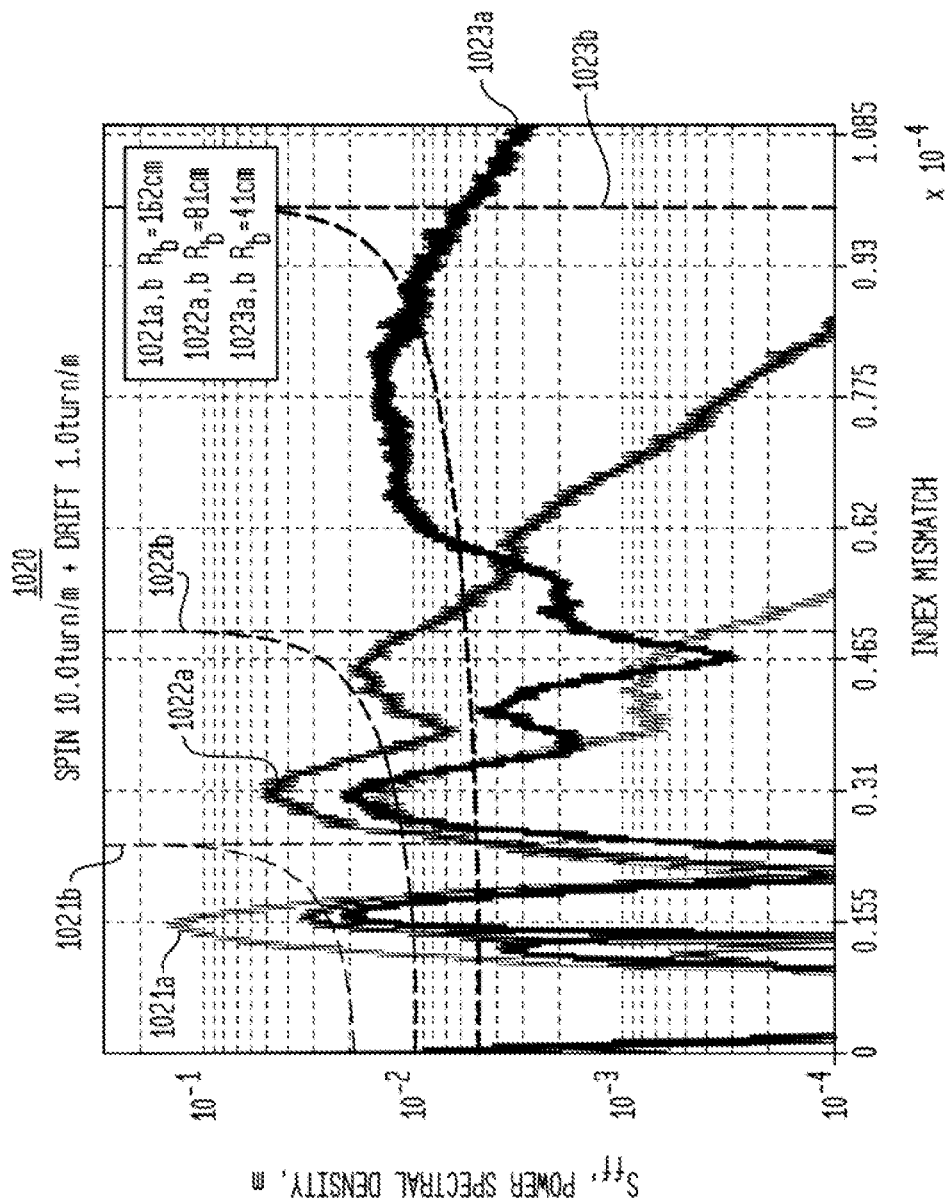

FIG. 12 shows a graph 1020 illustrating calculated crosstalk for a perturbation resulting from a constant-radius bend for a spun fiber. The spin rate has deterministic part of 10 turns/m plus a random drift of 1 turn/m. The PSD traces 1021a-1023a clearly show fine structure related to the periodicity of the bend perturbation, and differ substantially from the quasi-static approximation (traces 1021b-1023b). A perfectly periodic process with period Λ spin would have discrete PSD samples at index mismatch multiples of $\lambda/\Lambda = 0.155 \times 10^{-4}$. The grid lines on the plot are spaced by this amount, and the dominant peaks of the PSD fall at these index mismatch values.

The fine structure remains even if there is some variability in both the curvature and spin rate. As long as $R_{bend}$ and spin rate drift slowly, they seem constant on a length scale shorter than this drift; that is, locally and the PSD reflects a quasi periodicity with period $\Lambda_{spin}$.

Figure 13:
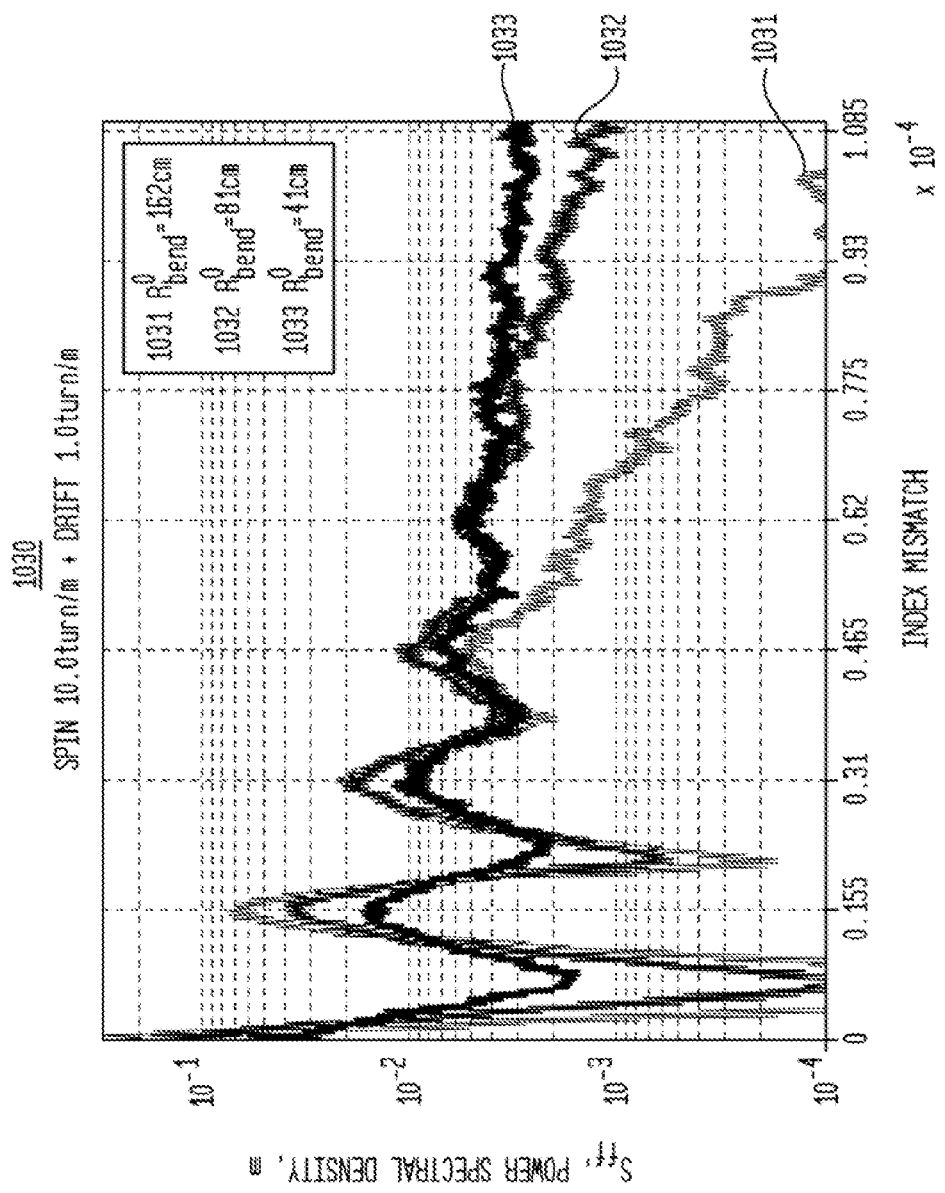

In the FIG. 13 graph 1030, a similar calculation is repeated where there is considerable random variation in the bend radius. The power spectral densities are shown by solid traces 1031-1033. The curvature is now equal to the nominal value (indicated in the legend) $1/R_{0bend}$ plus a random component with standard deviation $1/R_{0bend}$. The tail of the PSD is now much larger, since the random curvature variation can lead to large bend perturbations. The PSD curves are generally smoother, since there is more disorder in the system. However, the dominant peaks clearly still show the structure of the quasi-periodicity, falling at multiples of λ/Λ.

The highly structured spectrum could potentially have significant consequences for system performance. The fiber can be modeled as having random preform perturbations $\delta\beta_0$ that are constant with length (on a ~1 km scale), in addition to the bend perturbations. The bend perturbations may be statistically identical for the different core pairs, and for each kilometer of fiber, but each core pair and each spliced fiber has a different $\delta\beta_0$ nm. The highly structured PSD means that each time the PSD is sampled at a different random $\delta\beta_0$ nm, the total crosstalk will be very different, and there is thus a high variability of crosstalk from between core pairs, or from one fiber to a spliced (nearly identical fiber). This is true even if the fabrication tolerances are quite good: if the $\delta\beta_0$ nm values are controlled to index precision ~$10^{-5}$.

3.4 Fast Spin and Crosstalk Reduction

Figure 14:
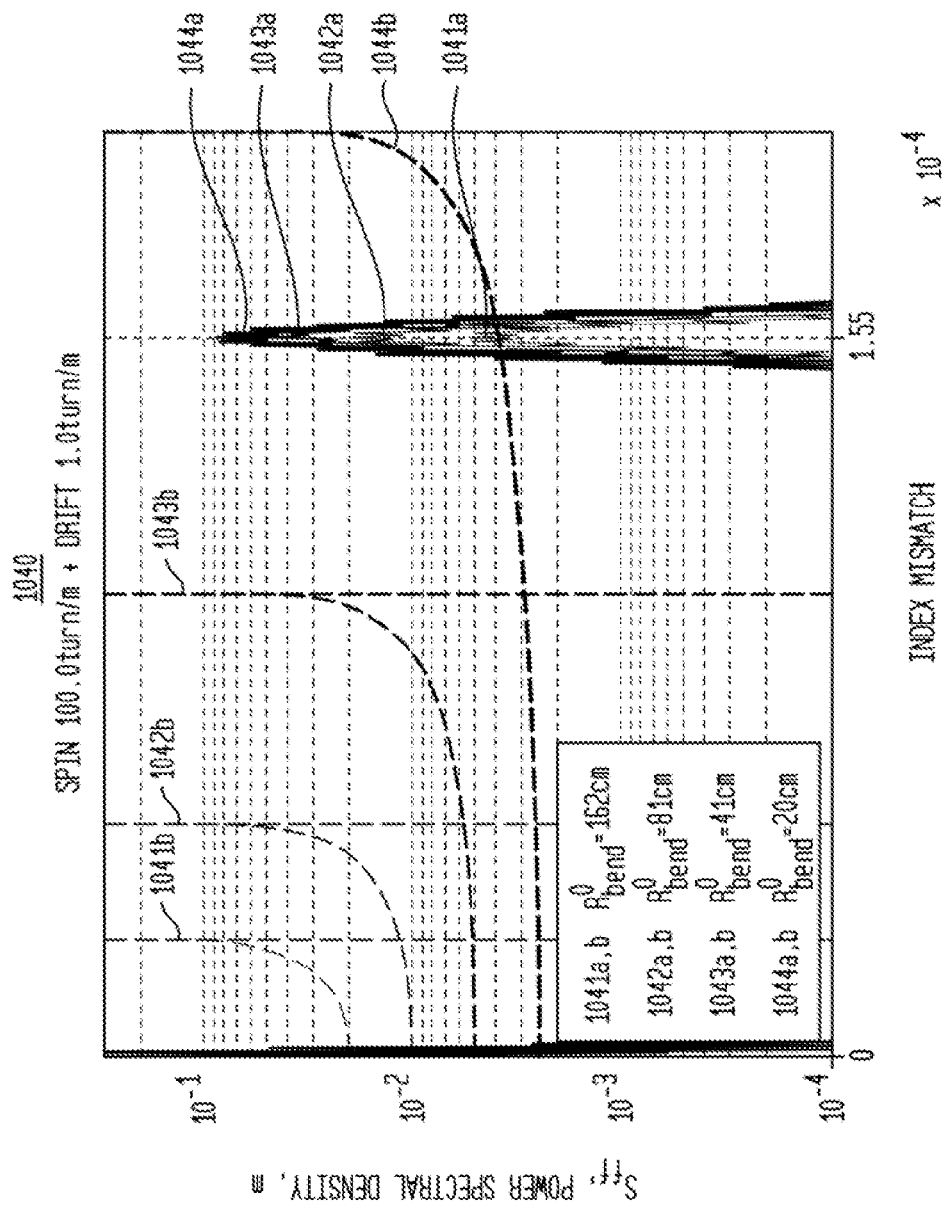

The results shown in FIGS. 12 and 13 do not immediately suggest that reduction of crosstalk has been successfully accomplished by spinning the fiber. For example, comparing the solid (spun) and dashed (un-spun) curves of the same bend radius (colors), it can be seen that spin sometimes increases and sometimes decreases crosstalk. In contrast, FIG. 14 shows a graph 1040 of an analogous calculation where the assumed spin (100 turns/meter) is fast relative to the magnitude of the bend-induced index perturbations. In FIG. 14, the power spectral densities are shown by solid traces 1041a-1044a and the quasi-static approximations are shown by dashed traces 1041b-1044b.

For this fast spin rate, the quasi-periodicity means that the PSD peaks are spaced by $2\pi/\Lambda$spin in δβ units or λ/Λspin on the Index Mismatch axis. For 1550 nm wavelength this is $1.55 \times 10^{-4}$. The calculated crosstalk is suppressed by orders of magnitude by the spin if the index mismatch can be maintained away from these peaks. For example, it is possible to target and index mismatch of $10^{-4}$ and control the index mismatch to a precision ~$0.5 \times 10^{-4}$.

Figure 15:
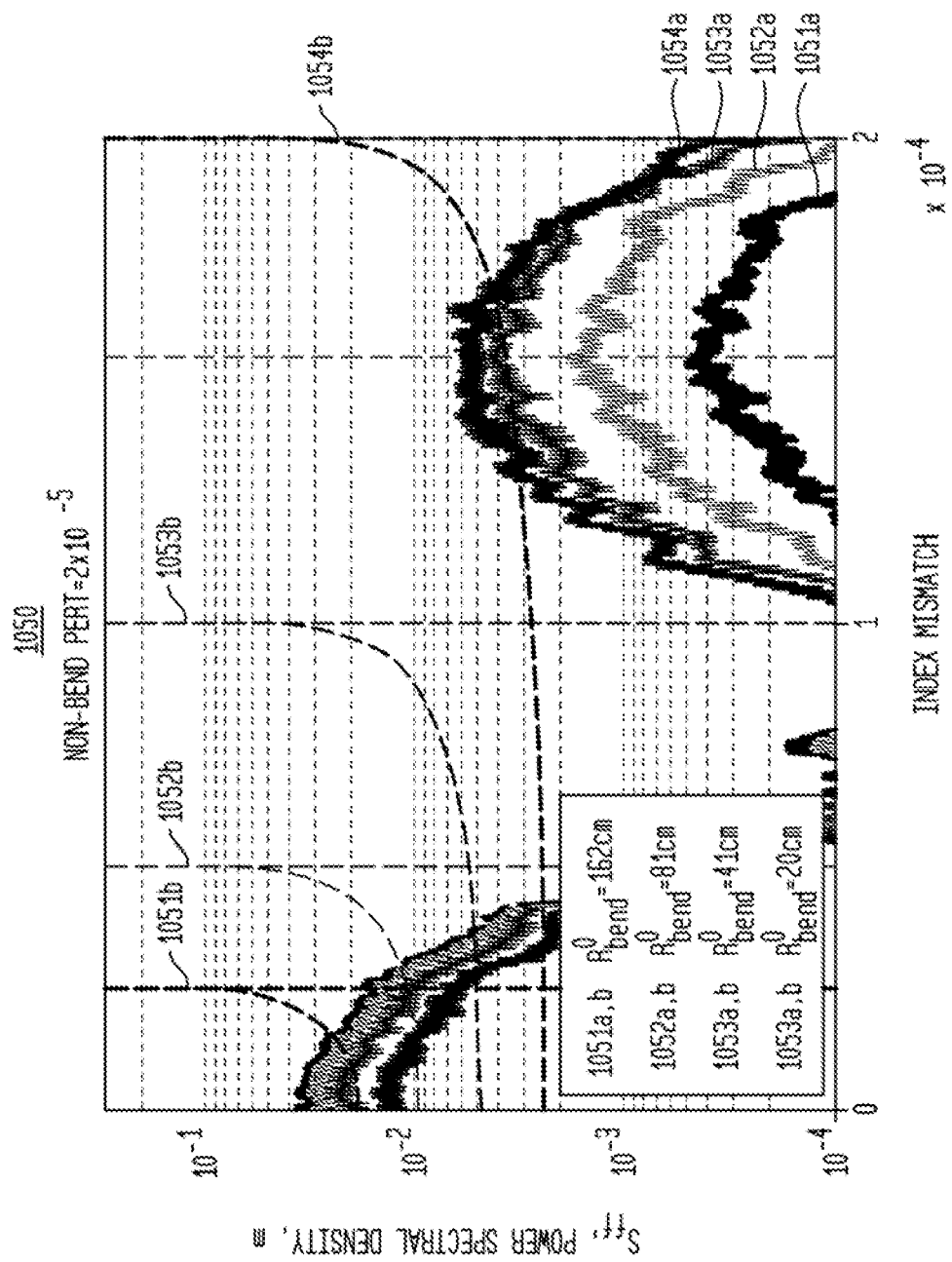
Figure 16:
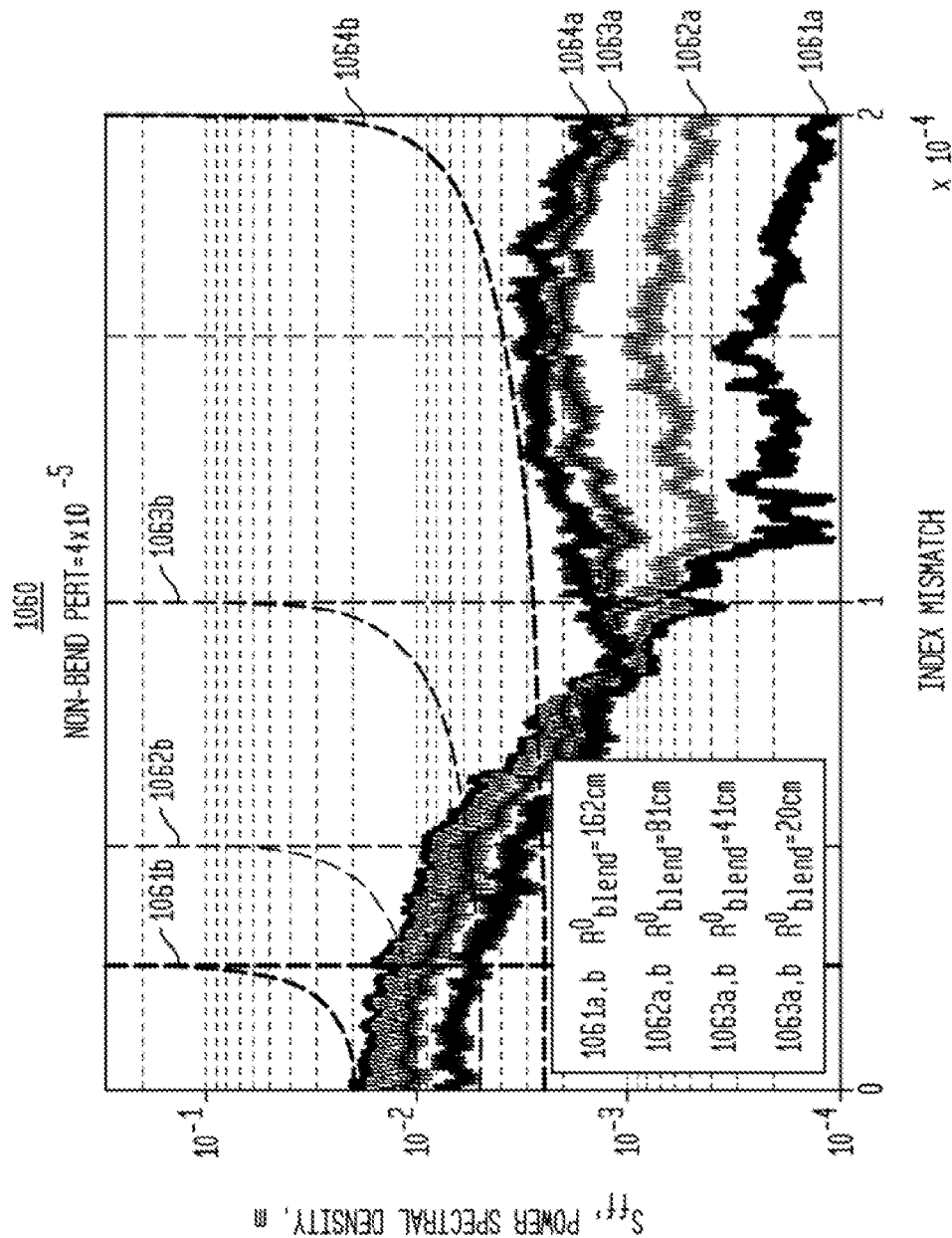

The calculation illustrated in the FIG. 14 graph 1040 is idealized in the sense that only bend perturbations are included. In FIGS. 15 and 16, the calculation is repeated with non-bend perturbations included, and with a random length-varying component to the bend radius itself. From the results, it can be seen that the spun crosstalk (solid traces 1051a-1054a in FIG. 15 and 1061a-1064a in FIG. 16) falls orders of magnitude below the un-spun crosstalk (dashed traces 1051b-1054b in FIG. 15 and 1061b-1064b in FIG. 16) as long as the non-bend perturbations are not too large. Also, the larger the non-bend perturbations are, the more tightly the index mismatch must be controlled to remain in the regime of large crosstalk suppression.

Successful crosstalk suppression can then be accomplished by simultaneously: generating spin with very short and well-defined spin period (e.g., on the order of <≲~2 cm, <≲~1 cm, or other suitable periods) reducing the non-bend length-variation index perturbations, and arranging for the index mismatch between neighboring cores to fall in-between the peaks of the PSD, which occur at multiples of λ/Λspin. Preferably, the index mismatch could be approximately 0.5λ/Λspin, or 1.5λ/Λspin. There is a tradeoff between the spin rate and the tolerances on index mismatch and non-bend perturbations. Higher spin rates relax these tolerances, but excessive spin rates may lead to fabrication problems, losses analogous to bend loss, or other difficulties.

3.5 Exemplary Practices

There are now discussed a number of exemplary practices that incorporate one or more of the aspects of the invention set forth herein. It will be appreciated that the aspects and practices of the invention may be employed individually, or in combination with each other or in combination with other teachings in the art.

As discussed herein, aspects and practices of the invention are employable to provide a multicore fiber two or more core regions disposed within a common cladding region, wherein each of the core regions is configured to guide, along the length of the fiber, a respective light transmission comprising at least one optical mode. The cores are arranged within the common cladding region according to a core configuration that substantially prevents crosstalk between modes of neighboring cores in the fiber, in a deployment of the fiber in which cross-coupling between neighboring cores is affected by perturbations arising in the deployed fiber.

According to a further aspect of the invention, the following relationship is used to model the accumulation of crosstalk $|dU|^2$ per unit length L in a multicore fiber:

$$\langle |dU|^2 \rangle / L \approx \left| \frac{2\pi C}{\lambda} \right|^2 S_{ff}(\Delta\beta)$$

wherein λ is the wavelength, C is the coupling coefficient, Δβ is the length-averaged mismatch between the propagation constants of the modes of neighboring cores, and $S_{ff}$ is the power spectral density of the phase mismatch induced by the length-varying part of said perturbations.

This relationship, and others discussed herein, are used to reduce or substantially eliminate crosstalk by controlling a number of different parameters, including one or more of the following: core configuration, fiber deployment, bend management, spinning or twisting, management of other perturbations, and the like.

Thus, exemplary practices of the invention include the following:

Exemplary Practice 1: The cores are configured to create a phase mismatch between neighboring cores that is sufficiently large so as to result in a low power spectral density. Some examples are set forth hereinabove. Effective index perturbations will be of order $10^{-5}$ to $10^{-4}$. Thus, a sufficiently large index mismatch between cores is expected to be on the order of $10^{-4}$ to $5\times10^{-4}$. The amount of crosstalk reduction depends on the size of the perturbations, and the shape of probability distribution for perturbations. It is believed that it may be possible to achieve a 10 to 100 times reduction in crosstalk compared with a similar fiber having no index mismatch.

Exemplary Practice 2: The fiber deployment is configured to reduce perturbations below a threshold value. As in Exemplary Practice 1, the amount of crosstalk reduction depends on the size of the perturbations, and the shape of probability distribution for perturbations. It is believed that it may be possible to achieve a 10 to 100 times reduction in crosstalk compared with a similar fiber having no index mismatch.

Exemplary Practice 3: In a fiber having a sufficiently low Δβ, the fiber deployment is configured to result in perturbations that are sufficiently large so as to result in low crosstalk between neighboring cores. The amount of crosstalk reduction is currently not known, but is expected to be on the order of a 2 to 10 times reduction in crosstalk compared with a similar fiber with no intentional perturbations.

Exemplary Practice 4: The cores are arranged in a configuration that minimizes the probability of phase-matching events between neighboring cores. Exemplary Practice 4 is an alternative way of looking at Exemplary Practices 1-3.

Exemplary Practice 5: The fiber is deployed such that there are gradual variations in the perturbations. "Gradual" variations include variations occurring on a scale of ~10 cm or longer. Alternatively, perturbations can be characterized as having "gradual" variations if the length scale of variation is longer than the wavelength divided by the size of the perturbations.

Exemplary Practice 6: The deployed fiber is configured to have perturbations resulting from at least one of: bends in the fiber, variations in fiber orientation, preform-derived variations, draw-induced variations, stress-induced variations, thermally-induced variations, chemically-induced variations, and radiation-induced variations.

A further aspect of the invention provides a multicore fiber, in which the fiber is deployed to have a rotational perturbation that is configured to prevent crosstalk between modes of neighboring cores in the fiber, in a deployment of the fiber in which cross-coupling between neighboring cores is affected by random bend perturbations arising in the deployed fiber.

Exemplary practices according to this aspect of the invention include some or all of the following:

Exemplary Practice 7: The rotational perturbation has a short and well-defined period Λspin and wherein the index mismatch between neighboring cores is not close to any integer multiple of λ/Λspin. Examples of "short" periods are set forth in Exemplary Practices 8 and 9. A period is "well-defined" if the spin rate varies by much less than its average. An example of a well-defined period is a fiber in which the spin rate everywhere along its length is within 25% of its average value.

Exemplary Practice 8: The spin period is much less than 10 cm, for example, no greater than approximately 2 cm.

Exemplary Practice 9: The spin period is no greater than approximately 1 cm.

Exemplary Practice 10: The index mismatch between neighboring cores is approximately $0.5\lambda/\Lambda_{spin}$.

Exemplary Practice 11: The index mismatch between neighboring cores is approximately $1.5\lambda/\Lambda_{spin}$.

Exemplary Practice 12: The length-varying index perturbations to the fiber, other than bend variations, are minimized.

Exemplary Practice 13: The length-varying non-bend perturbations are significantly less than $\lambda/\Lambda_{spin}$. "Significantly less than $\lambda/\Lambda_{spin}$" can mean, for example, that the standard deviation of the index mismatch is less than 25% of $\lambda/\Lambda_{spin}$.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

The invention claimed is:

1. A multicore optical fiber, comprising: two or more core regions disposed within a common cladding region, wherein each of the core regions is configured to guide a respective light transmission comprising at least one optical mode along the length of the fiber, wherein the cores are arranged within the common cladding region according to a core configuration that prevents crosstalk between modes of neighboring cores in the fiber in a deployment of the fiber in which cross-coupling between neighboring cores is affected by a perturbations arising in the deployed fiber, wherein the cross talk $\langle|dU|^2\rangle$ accumulates per unit length L, substantially in accordance with a relationship:

$$\langle|dU|^2\rangle/L \approx \left|\frac{2\pi C}{\lambda}\right|^2 S_{ff}(\Delta\beta);$$

wherein $\lambda$ is the wavelength, C is the coupling coefficient, $\Delta\beta$ is the length-average mismatch between the propagation constants of the modes of neighboring cores, and $S_{ff}$ is the power spectral density of the phase mismatch induced by the length v-varying part of said perturbations.

2. The fiber of claim 1, wherein the cores are further configured so as to result in a phase mismatch between neighboring cores that is sufficiently large so as to result in a low power spectral density.

3. The fiber of claim 2, wherein the perturbations occurring in the fiber deployment are configured to reduce crosstalk below a threshold value.

4. The fiber of claim 1, wherein the fiber deployment is configured such that, in a fiber having a $\Delta\beta$ below a selected level, the perturbations are sufficiently large so as to result in a desired crosstalk between neighboring cores.

5. The fiber of claim 4, wherein the desired crosstalk is low.

6. The fiber of claim 4, wherein the desired crosstalk is high along a specified length.

7. The fiber of claim 1, wherein the cores are arranged in a configuration that minimizes the probability of phase-matching events between neighboring cores.

8. The fiber of claim 7, wherein the fiber is deployed such that there are gradual variations in the perturbations.

9. The fiber of claim 1, wherein the deployed fiber is configured to have perturbations resulting from at least one of:
bends in the fiber,
variations in fiber orientation around the axis of propagation,
preform-derived variations,
draw-induced variations,
stress-induced variations,
thermally-induced variations,
chemically-induced variations, and
radiation-induced variations.

10. A method for estimating average crosstalk $\langle|dU|^2\rangle$ between cores in a multicore fiber subject to perturbations, comprising:
modeling accumulated crosstalk per unit length L as $$\langle|dU|^2\rangle/L \approx \left|\frac{2\pi C}{\lambda}\right|^2 S_{ff}(\Delta\beta)$$

wherein $\lambda$ is the wavelength, C is the coupling coefficient, $\Delta\beta$ is the length-averaged mismatch between the propagation constants of the two modes, and $S_{ff}$ is the power spectral density of the phase mismatch induced by the length-varying part of perturbations.

11. The method of claim 10, wherein the perturbations result from at least one of:
bends in the fiber,
variations in fiber orientation around the axis of propagation,
preform-derived variations,
draw-induced variations,
stress-induced variations,
thermally-induced variations,
chemically-induced variations, and
radiation-induced variations.

* * * * *